United States Patent
Ni

(10) Patent No.: US 12,045,634 B2
(45) Date of Patent: Jul. 23, 2024

(54) APPLICATION COMBINATION ESTABLISHMENT METHOD AND ELECTRONIC DEVICE

(71) Applicant: Huawei Technologies Co., Ltd., Shenzhen (CN)

(72) Inventor: Jing Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/764,858

(22) PCT Filed: Jul. 23, 2020

(86) PCT No.: PCT/CN2020/103879
§ 371 (c)(1),
(2) Date: Mar. 29, 2022

(87) PCT Pub. No.: WO2021/063090
PCT Pub. Date: Apr. 8, 2021

(65) Prior Publication Data
US 2022/0342682 A1     Oct. 27, 2022

(30) Foreign Application Priority Data
Sep. 30, 2019 (CN) .......................... 201910944834.0

(51) Int. Cl.
*G06F 9/451* (2018.01)
*G06F 3/04817* (2022.01)
(Continued)

(52) U.S. Cl.
CPC .......... *G06F 9/451* (2018.02); *G06F 3/04817* (2013.01); *G06F 3/0482* (2013.01);
(Continued)

(58) Field of Classification Search
CPC .... G06F 9/451; G06F 3/04817; G06F 3/0482; G06F 3/0484; G06F 3/0488
See application file for complete search history.

(56) References Cited

U.S. PATENT DOCUMENTS

2012/0169883 A1     7/2012  Chang et al.
2013/0120447 A1*    5/2013  Kim ........................ G06F 9/451
                                                          345/173
(Continued)

FOREIGN PATENT DOCUMENTS

CN     104007894 A     8/2014
CN     105094656 A     11/2015
(Continued)

*Primary Examiner* — William L Bashore
*Assistant Examiner* — Gregory A Distefano
(74) *Attorney, Agent, or Firm* — Conley Rose, P.C.

(57) ABSTRACT

An application combination establishment method, implemented by an electronic device, includes determining usage of all or some of N applications running on the electronic device and establishing a first combination based on the usage, where the first combination includes a first application and a second application in the N applications. In the application combination establishment method, an application combination may be automatically established based on usage of an application, and a user does not need to manually select an application to establish an application combination.

20 Claims, 25 Drawing Sheets

(51) Int. Cl.
    *G06F 3/0482*     (2013.01)
    *G06F 3/0484*     (2022.01)
    *G06F 3/0488*     (2022.01)

(52) U.S. Cl.
    CPC .......... *G06F 3/0484* (2013.01); *G06F 3/0488* (2013.01); *G06F 2203/04803* (2013.01); *G06F 2203/04808* (2013.01)

(56) References Cited

U.S. PATENT DOCUMENTS

| | | | |
|---|---|---|---|
| 2013/0232451 A1 | 9/2013 | Chen et al. | |
| 2013/0263042 A1* | 10/2013 | Buening | G06F 3/04883 |
| | | | 715/783 |
| 2014/0331174 A1* | 11/2014 | Wen | G06F 3/04883 |
| | | | 715/804 |
| 2015/0160931 A1* | 6/2015 | Glazer | G06F 9/452 |
| | | | 717/109 |
| 2016/0034145 A1* | 2/2016 | Lee | G06F 3/0486 |
| | | | 715/765 |
| 2017/0269813 A1* | 9/2017 | Cho | G06F 3/04886 |
| 2018/0329550 A1* | 11/2018 | Dellinger | G06F 3/04883 |
| 2020/0320906 A1* | 10/2020 | Knarr | G06F 1/1626 |

FOREIGN PATENT DOCUMENTS

| | | |
|---|---|---|
| CN | 106201166 A | 12/2016 |
| CN | 108563416 A | 9/2018 |
| CN | 108614655 A | 10/2018 |
| CN | 108984142 A | 12/2018 |
| CN | 111208925 A | 5/2020 |
| EP | 4024184 A1 | 7/2022 |

\* cited by examiner

Home screen widget

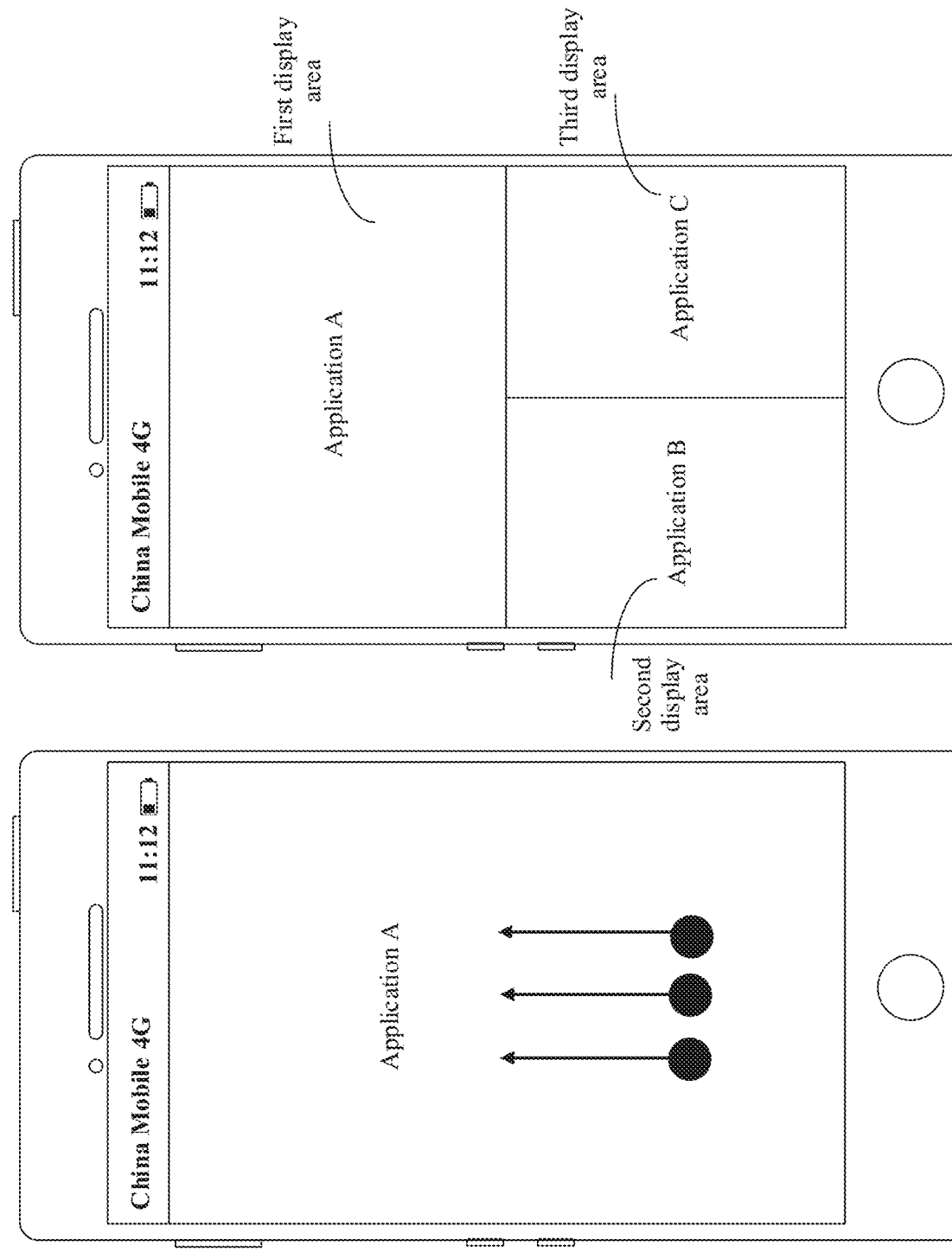

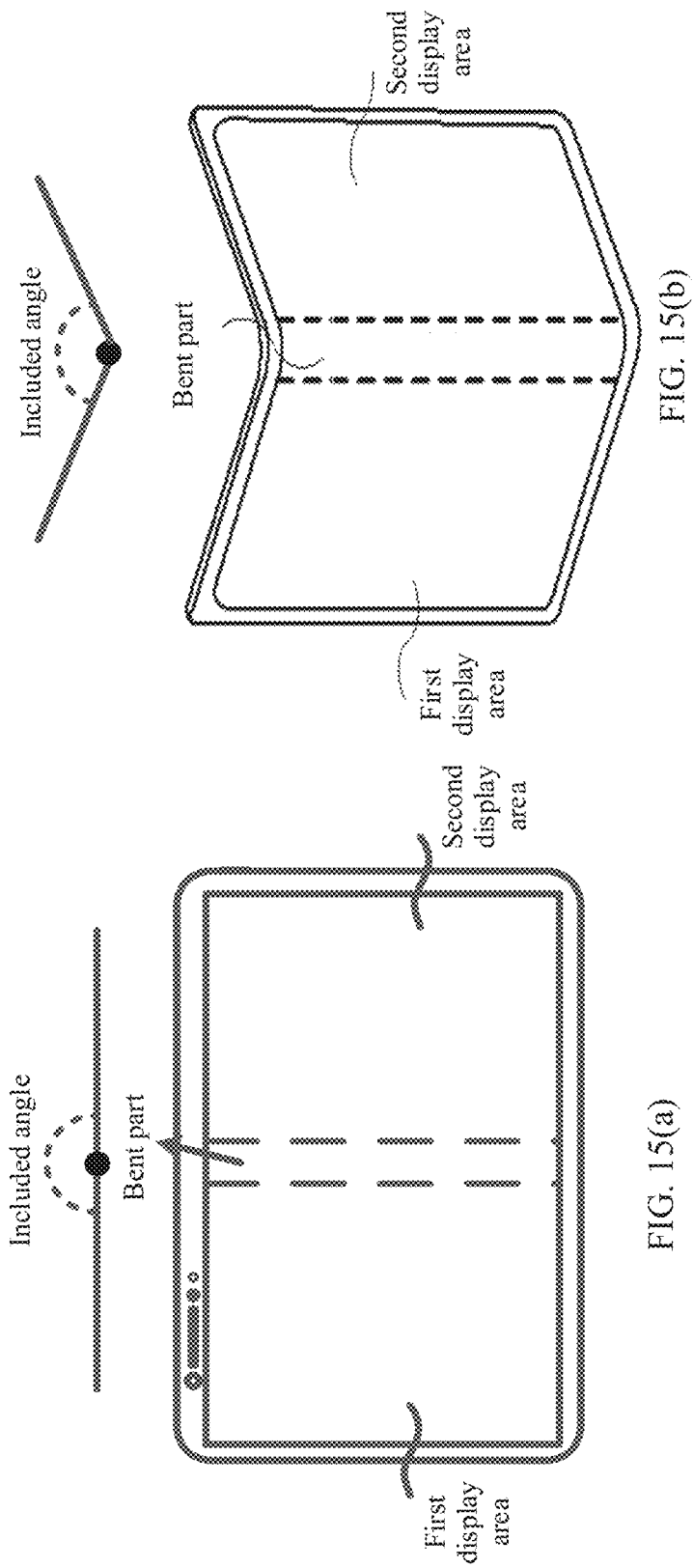

APPLICATION COMBINATION ESTABLISHMENT METHOD AND ELECTRONIC DEVICE

CROSS-REFERENCE TO RELATED APPLICATIONS

This is a U.S. National Stage of International Patent Application No. PCT/CN2020/103879 filed on Jul. 23, 2020, which claims priority to Chinese Patent Application No. 201910944834.0 filed on Sep. 30, 2019. Both of the aforementioned applications are hereby incorporated by reference in their entireties.

TECHNOLOGY

This application relates to the field of terminal technologies, and in particular, to an application combination establishment method and an electronic device.

BACKGROUND

To improve visual experience, screens of various electronic devices become larger. The electronic device provides a split-screen mode (also referred to as an area-based display mode), to meet a requirement of a user to simultaneously operate a plurality of applications. For example, the electronic device may simultaneously display windows of two applications.

Currently, a process in which the electronic device simultaneously displays the windows of the two applications may be as follows: When displaying an application window of an application A in full screen, the electronic device enters a split-screen mode triggered by a gesture. In the split-screen mode, the application window of the application A is displayed in an upper half display area of the display of the electronic device. Icons of a plurality of applications that support a screen splitting function are displayed in a lower half display area. In response to the user tapping an icon of an application B in the lower half display area, the electronic device displays an application window of the application B in the lower half display area, so that the application window of the application A and the application window of the application B are displayed in split-screens. It can be learned that an operation process in which the electronic device simultaneously displays the application windows of the two applications is relatively complex, and includes at least an operation of triggering screen splitting by the gesture and an operation of selecting the application B. In addition, when there are many applications that support the screen splitting function, the user has to select from a plurality of application icons, which makes low efficiency.

To resolve the technical problem, an application combination establishment solution is provided in the industry. For example, the user enters a setting mode. In the setting mode, the electronic device displays an application list, and the user selects any two applications from the application list to establish an application combination. In response to an operation performed by the user on an icon of the application combination of the electronic device, the electronic device may display application windows of the two applications in split-screens, so that an operation of simultaneously displaying the application windows of the two applications is simplified. This solution still suffers from inefficiencies. For example, when setting up the combination, the user still has to choose from many applications.

SUMMARY

This application provides an application combination establishment method and an electronic device, so as to establish an application combination based on usage of different applications in the electronic device, without a user manually selecting combined applications. In this way, an operation by the user is facilitated.

According to a first aspect, an embodiment of this application provides an application combination establishment method. The method may be applied to an electronic device, and the electronic device may be a mobile phone, a tablet computer, or the like. The electronic device may determine usage of all or some applications in N installed applications, and then establish a first combination based on the usage. For example, the first combination includes a first application and a second application in the N applications. In other words, the electronic device may automatically set an application combination based on usage of an application, and the user does not need to manually select applications to establish an application combination, and an operation is simple.

With reference to the first aspect, in a possible implementation of the first aspect, the usage of the application includes a quantity of times of using the application, usage duration, a usage time, a quantity of switching times, and/or simultaneously displaying a plurality of application windows. When the usage of the application includes the quantity of using times, the electronic device may automatically save, as one application combination, at least two applications whose quantity of using times within preset duration reaches a preset quantity of times. For another example, when the usage of the application includes the usage duration, the electronic device may automatically set, as one application combination, the at least two applications whose usage duration reaches a threshold within the preset duration. For another example, when the usage of the application includes the usage time, the electronic device may automatically save at least two recently used applications as one application combination. For another example, when the usage of the application includes the quantity of switching times, the electronic device may automatically set, as an application combination, at least two applications whose quantity of switching times within preset duration reaches a preset quantity of times. For another example, when the usage of the application includes simultaneously displaying the plurality of application windows, the electronic device may set a plurality of applications being displayed as one application combination. For example, the electronic device detects a preset input operation, and in response to the input operation, automatically sets, as one application combination, at least two applications on which an application window is being displayed.

It should be noted that the electronic device may set an application combination only based on a parameter that reflects usage of the application by the user, for example, set the application combination only based on the quantity of times of using the application, or set the application combination based on a quantity of parameters that reflect usage of the application by the user, for example, set the application combination based on the quantity of using times and the quantity of switching times.

With reference to the first aspect, in a possible implementation of the first aspect, the electronic device may determine the usage of the application at a preset moment; or receive a second user operation, and determine the usage of the application in response to the second user operation. In other words, the electronic device may automatically determine the usage of the application at the preset moment, or may determine the usage of the application when the application is operated by the user. This is not limited in this embodiment of this application.

With reference to the first aspect, in a possible implementation of the first aspect, when the electronic device establishes the first combination, the first combination includes the first application and the second application, and the electronic device may further store a first layout manner of the first application and the second application. For example, when application windows of a plurality of applications are displayed in the first layout manner, if detecting a preset input operation, the electronic device automatically sets, in response to the input operation, the plurality of applications whose application windows are being displayed as one application combination, and stores the first layout manner of the plurality of applications. Therefore, after detecting the operation used to open the first combination, the electronic device may display the application windows of the plurality of applications in the first layout manner, so as to facilitate an operation by the user.

With reference to the first aspect, in a possible implementation of the first aspect, the first layout manner includes a display position and/or a display area. The "display position" may include the first application and a display position of the first application on a display. For example, the first application is located on a left side of the display, and the second application is located on a right side of the display. The "display position" may further include an upper-layer relationship between the first application and the second application. For example, the first application is at an upper layer of the second application, or the second application is at an upper layer of the first application. The "display area" may be an area of a display area on the display occupied by the application window of the first application or the second application.

With reference to the first aspect, in a possible implementation of the first aspect, after establishing the first combination, the electronic device may further display a first combination icon of the first combination, where the first combination icon includes an identifier of the first application and an identifier of the second application. In other words, the first combination icon corresponding to the first combination may reflect a quantity of applications included in the first combination, and may further reflect a specific application in the first combination. Therefore, the user may intuitively and quickly learn, by using the first combination icon, which applications are included in the first combination.

With reference to the first aspect, in a possible implementation of the first aspect, when displaying the first combination icon, the electronic device may display the first combination icon based on the first layout manner. For example, the first layout manner is that the first application is located on a left side of the display, and the second application is located on a right side of the display. Correspondingly, in the first combination icon, the identifier of the first application is located on the left side, and the identifier of the second application is located on the right side. That is, the first combination icon may reflect a layout between the first application and the second application in the first combination. In other words, the user may intuitively and quickly learn, by using the first combination icon, layouts of the two applications corresponding to the first combination icon, and user experience is relatively high.

After displaying the first combination icon, if detecting an operation on the first combination icon, the electronic device may simultaneously display the first application window of the first application and the second application window of the second application. Specifically, the first application window and the second application window may be displayed based on the first layout manner, that is, the saved layout manner is restored. This facilitates a user operation and improves user experience.

With reference to the first aspect, in a possible implementation of the first aspect, a position relationship between a first identifier of the first application and a second identifier of the second application included in the first combination icon is the same as a position relationship between the first application window and the second application window; or a ratio of an area of the first identifier to an area of the second identifier included in the first combination icon is the same as a ratio of a display area of the first application window to a display area of the second application window. In other words, the first combination icon may reflect a layout (the display position and the display area) between the first application and the second application in the first combination. In other words, the user may intuitively and quickly learn, by using the first combination icon, layouts of the two applications corresponding to the first combination icon, and user experience is relatively high.

With reference to the first aspect, in a possible implementation of the first aspect, before determining the usage, the electronic device may further establish a virtual combination corresponding to a specified application type, where the specified application type includes a first application type and a second application type. In other words, the electronic device may preset a virtual combination of a specified application type, and then the electronic device may establish an application combination based on usage of an application of the specified application type, to achieve an objective of automatically setting the application combination.

With reference to the first aspect, in a possible implementation of the first aspect, the N applications installed on the electronic device include X applications whose application types are the first application type and Y applications whose application types are the second application type, where the X applications include the first application, the Y applications include the second application, both X and Y are integers greater than or equal to 1, X and Y may be equal or unequal, and a sum of X and Y is less than or equal to N. Therefore, after setting the virtual combination corresponding to the first application type and the second application type, the electronic device may establish the first combination based on usage of all or some of the X applications in the first application type and usage of all or some of the Y applications in the second application type. The first combination includes the first application of the X applications and the second application of the Y applications. In other words, the electronic device may preset a virtual combination of a specified application type, and then the electronic device may establish an application combination based on usage of an application of the specified application type, to achieve an objective of automatically setting the application combination.

With reference to the first aspect, in a possible implementation of the first aspect, when the electronic device establishes the virtual combination corresponding to the specified application type, but has not established the application combination based on the usage of the application of the specified application type, the electronic device may first display a virtual combination icon of the virtual combination. For example, in this case, the virtual combination icon may be an empty icon. After establishing the application combination based on the usage of the application of the specified application type, the electronic device may update the virtual combination icon, for example, add an identifier of an application in the application combination to an empty icon.

With reference to the first aspect, in a possible implementation of the first aspect, when the electronic device establishes the virtual combination corresponding to the specified application type, but has not established the application combination based on the usage of the application of the specified application type, the electronic device may first display a virtual combination icon of the virtual combination. The virtual combination icon includes an identifier of the first application type and an identifier of the second application type.

With reference to the first aspect, in a possible implementation of the first aspect, after displaying the virtual combination icon, the electronic device may receive a first user operation on the virtual combination icon; and determine, in response to the first user operation, usage of an application in a specified application type corresponding to the virtual combination icon. In other words, after displaying the virtual combination icon, the electronic device determines the usage of the application of the specified application type corresponding to the virtual combination only when a user operation on the virtual combination icon is detected, and then establishes the first combination based on the usage. Then, the electronic device may simultaneously display the first application window of the first application and the second application window of the second application.

With reference to the first aspect, in a possible implementation of the first aspect, when displaying the first application window of the first application, if receiving an area-based display instruction, the electronic device obtains, in response to the area-based display instruction, a first combination related to the first application, where the first combination includes the first application and the second application. Then, the electronic device simultaneously displays the first application window of the first application and the second application window of the second application. In other words, after the electronic device establishes the first application and the second application as the first combination, if the electronic device currently displays the first application, the electronic device may quickly enter a split-screen mode by using the area-based display instruction, and simultaneously display the application windows of the first application and the second application in the split-screen mode. In this way, an effect of quickly opening an associated application is implemented.

With reference to the first aspect, in a possible implementation of the first aspect, the electronic device may further establish a second combination, where the second combination includes a first application and a third application. In other words, the first combination and the second combination include a same application, that is, the first application. When displaying the first application window of the first application, if receiving an area-based display instruction, the electronic device obtains, in response to the area-based display instruction, the first combination related to the first application and the second combination, and then, simultaneously displays the first application window of the first application, the second application window of the second application, and the third application window of the third application. In other words, when the plurality of combinations all include the first application, when displaying the first application, the electronic device may quickly enter the split-screen mode. In the split-screen mode, the electronic device may simultaneously display application windows of the first application and related applications in the plurality of combinations. Alternatively, the electronic device may further display the identifier of the second application and an identifier of the third application for selection by the user. If the user selects the identifier of the second application, both the first application window and the second application window are displayed. If the user selects the identifier of the third application, both the first application window and the third application window of the third application are displayed, so as to facilitate an operation by the user.

With reference to the first aspect, in a possible implementation of the first aspect, the electronic device may be a foldable mobile phone. For the foldable mobile phone, the area-based display instruction includes an instruction for changing the foldable mobile phone from a folded state to an expanded state. For example, if the foldable mobile phone is currently in the folded state and displays the first application window of the first application, and if it is detected that the foldable mobile phone changes from the folded state to the expanded state, the first application window is displayed in the first display area, and the second application window is displayed in the second display area; or the first application window of the first application is displayed in full screen, and the identifier of the second application is displayed in an upper layer of the first application window. If an operation on the identifier of the second application is detected, the split-screen mode is entered. The first application window of the first application is displayed in the first display area, and the second application window of the second application is displayed in the second display area.

With reference to the first aspect, in a possible implementation of the first aspect, the area-based display instruction may further include multi-finger upward sliding. For example, if the electronic device currently displays the first application window of the first application, and detects the multi-finger upward sliding, the electronic device displays the first application window in the first display area, and displays the second application window in the second display area. Alternatively, the electronic device displays the first application window in the first display area, and displays the identifier of the second application in the second display area. The split-screen mode is entered if an operation on the identifier of the second application is detected. The electronic device displays the first application window of the first application in the first display area, and displays the second application window of the second application in the second display area. Alternatively, the electronic device displays the first application window in full screen, and displays the identifier of the second application on the upper layer of the first application window.

According to a second aspect, an embodiment of this application further provides an electronic device. The electronic device includes one or more touchscreens; one or more processors; one or more memories. The one or more memories store one or more computer programs, the one or more computer programs include instructions, and when the instructions are executed by the one or more processors, the electronic device is enabled to implement the technical solution in the first aspect and any possible design of the first aspect. The electronic device may be a foldable mobile phone.

According to a third aspect, an embodiment of this application further provides an electronic device. The electronic device includes modules/units that perform the method according to any one of the first aspect and the possible designs of the first aspect. These modules/units may be implemented by hardware, or may be implemented by hardware by executing corresponding software.

According to a fourth aspect, an embodiment of this application further provides a chip. The chip is coupled to a memory in an electronic device, and is configured to invoke a computer program stored in the memory and execute a technical solution in any one of the first aspect and the possible designs of the first aspect in this embodiment of this application. In this embodiment of this application, "coupling" means a direct combination or an indirect combination of two components.

According to a fifth aspect, an embodiment of this application further provides a computer-readable storage medium. The computer-readable storage medium includes a computer program. When the computer program is run on an electronic device, the electronic device is enabled to perform the technical solution in any one of the first aspect of the embodiments of this application or the possible designs of the first aspect.

According to a sixth aspect, a program product according to an embodiment of this application includes instructions, and when the program product runs on an electronic device, the electronic device is enabled to perform the technical solution according to any one of the first aspect and the possible designs of the first aspect of the embodiments of this application.

BRIEF DESCRIPTION OF DRAWINGS

FIG. 11(a) and FIG. 11(b) are a schematic diagram of a first scenario of Embodiment 3 according to an embodiment of this application;

FIG. 15(a) and FIG. 15(b) are a schematic diagram of a structure of a foldable mobile phone according to an embodiment of this application;

DESCRIPTION OF EMBODIMENTS

Figure 1:
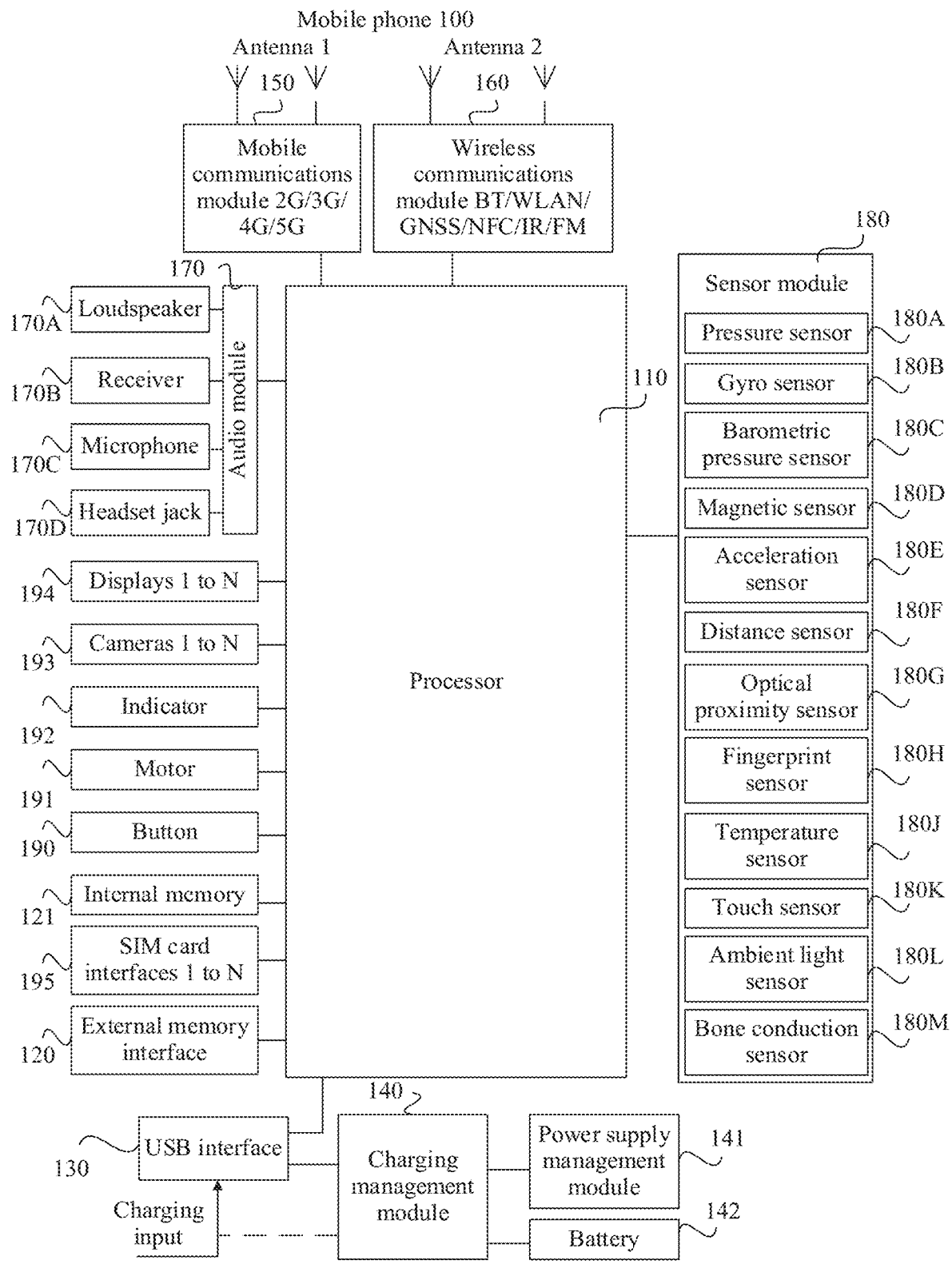
FIG. 1 is a schematic diagram of a hardware structure of a mobile phone 100 according to an embodiment of this application.

Technical solutions in the embodiments of this application are described in detail below with reference to accompanying drawings of following embodiments of this application.

The following describes some terms in the embodiments of this application to help persons skilled in the art have a better understanding.

An application (application, app for short) in the embodiments of this application is referred to as an application for short and is a software program that can implement one or more specific functions. Generally, a plurality of applications may be installed on a terminal device, for example, an instant messaging application, a video application, an audio application, an image shooting application. The instant messaging application may include, for example, Messages, WeChat (WeChat), WhatsApp Messenger, LINE (Line). Instagram (Instagram), Kakao Talk, and DingTalk. The image shooting application may include, for example, a camera application (a system camera or a third-party camera application). The video applications may include, for example, YouTube, Twitter, TikTok, iQIYI, and Tencent Video. The audio application may include, for example, Google Music, KuGou, EMUMO, and QQ Music. The application mentioned below may be an application installed when the terminal device is delivered from a factory, or may be an application downloaded from a network or obtained from another terminal device in a process in which a user uses the terminal device.

An application window in the embodiments of this application refers to a display area, and a display interface of an application is displayed in the display area. One application can correspond to one application window. An application window may be zoomed out or zoomed in, so that a display interface in the application window is zoomed out or zoomed in. Content of an application window may vary. For example, content displayed in the application window when the application is first started may be different from content displayed during use.

An application running in the foreground in the embodiments of this application is an application that is currently running on an electronic device and that is being displayed on a display. An application running in the background in the embodiments of this application is an application that is currently running on the electronic device but is not displayed on the display.

"Opening" an application in the embodiments of this application may be starting the application and displaying the application in the foreground, or switching the application running in the background to the foreground for running.

A "combination icon" in the embodiments of this application is an icon corresponding to an application combination. One application combination may include at least two applications. The combination icon may be used as an entry for quickly opening a plurality of applications. For example, when detecting an operation on a combination icon, the electronic device may simultaneously display application windows of at least two applications in an application combination corresponding to the combination icon.

"Simultaneously displaying A and B" in this embodiment of this application means: displaying A and B at a same time, displaying A and B within a preset time, or displaying A and B at a time interval less than or equal to a preset threshold.

"Displaying A and B at areas" in this embodiment of this application may be displaying A and B without overlapping each other or displaying A and B at areas without overlapping each other. That A and B do not overlap each other may be that A and B jointly occupy all areas (hereinafter referred to as "displayable areas") that can be used to display the application windows on the display, or A and B do not occupy all areas that can be used to display the application windows on the display (for example, there is a gap area between A and B). If a status bar cannot be hidden, a displayable area is all display areas except the status bar. If the status bar can be hidden, the displayable area is the entire display area on the display. The status bar is an area on the display that is used to display a time, a battery level, operator information, and the like.

The electronic device in the embodiments of this application may be any electronic device having a display, for example, a portable electronic device such as a mobile phone or a tablet computer, or may be a non-convenient electronic device such as a desktop computer or a television, or may be a wearable electronic device such as a wristband, a watch, or a wearable device helmet, or may be a vehicle-mounted device, a smart home device (for example, a television), or the like. This is not limited in this embodiment of this application.

In the embodiments of this application, "at least one" means one or more, and "more" thereof means two or more. In addition, it should be understood that in descriptions of this application, words such as "first" and "second" are merely intended for purposes of description, and should not be understood as expressing or implying relative importance or a sequence.

Terms used in the following embodiments of this application are merely intended to describe specific embodiments, but are not intended to limit this application. Terms "one", "a" and "this" of singular forms used in this specification and the appended claims of this application are also intended to include expressions such as "one or more", unless otherwise specified in the context clearly. It should be further understood that, in the embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "one embodiment" or "some embodiments" described in this specification or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. Terms "include", "comprise", "have", and their variants all mean "include but are not limited to", unless otherwise specifically emphasized.

An electronic device, a graphical user interface (graphical user interface, GUI) for such an electronic device, and embodiments for using such an electronic device are described below. In the following embodiments, an example in which the electronic device is a mobile phone is used. FIG. 1 is a schematic diagram of a structure of the mobile phone. As shown in FIG. 1, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the mobile phone 100. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

The USB interface 130 is an interface that complies with a USB standard specification, and may be specifically a mini USB interface, a micro USB interface, a USB Type-C interface, or the like. The USB interface 130 may be configured to connect to the charger to charge the mobile phone 100, or may be configured to transmit data between the mobile phone 100 and a peripheral device. The charging management module 140 is configured to receive a charging input from the charger. The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communications module 160, and the like.

A wireless communication function of the mobile phone 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the mobile phone 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution, applied to the mobile phone 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a solution to wireless communication applied to the mobile phone 100, for example, a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 of the mobile phone 100 are coupled, and the antenna 2 and the wireless communications module 160 of the mobile phone 100 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeidDou navigation satellite system (beidou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application and the like. The display 194 includes a display panel. The display panel may be a liquid crystal display (liquid crystal display, LCD), an organic light-emitting diode (organic light-emitting diode. OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the mobile phone 100 may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, software code of at least one application (such as iQIYI or WeChat), and the like. The data storage area may store data (for example, an image and a video) and the like generated in a process of using the mobile phone 100. In addition, the internal memory 121 may include a high-speed random access memory, and may further include a nonvolatile memory, for example, at least one magnetic disk storage device, a flash memory, and a universal flash storage (universal flash storage, UFS).

The external memory interface 120 may be configured to connect to an external storage card such as a micro SD card, to extend a storage capability of the mobile phone 100. The external storage card communicates with the processor 110 through the external memory interface 120, to implement a data storage function. For example, files such as an image and a video are stored in the external memory card.

The mobile phone 100 may implement an audio function such as music playing or recording over the audio module 170, the loudspeaker 170A, the telephone receiver 170B, the microphone 170C, the headset jack 170D, the application processor.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes).

The gyroscope sensor 180B may be configured to perform image stabilization during photographing. The barometric pressure sensor 180C is configured to measure barometric pressure. In some embodiments, the mobile phone 100 calculates an altitude based on a value of the atmospheric pressure measured by the barometric pressure sensor 180C, to assist positioning and navigation. The magnetic sensor 180D includes a Hall effect sensor. The mobile phone 100 may detect opening and closing of a flip leather cover by using the magnetic sensor 180D. In some embodiments, when the mobile phone 100 is a clamshell phone, the mobile phone 100 may detect opening and closing of a clamshell by using the magnetic sensor 180D. Further, a feature such as automatic unlocking upon opening of the flip cover is set based on a detected opening or closing state of the flip cover. The acceleration sensor 180E may detect a magnitude of acceleration of the mobile phone 100 in various directions (usually on three axes). When the mobile phone 100 remains stationary, a value and a direction of gravity may be detected. The acceleration sensor may be further configured to identify a posture of the electronic device, and is used in an application such as switching between a landscape mode and a portrait mode or a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing. The optical proximity sensor 180G may include, for example, a light-emitting diode (LED) and an optical detector such as a photodiode. The light-emitting diode may be an infrared light emitting diode. The mobile phone 100 may emit infrared light by using the light emitting diode. The mobile phone 100 detects reflected infrared light from a nearby object by using the photodiode. When sufficient reflective light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may also be used in a leather case mode or a pocket mode to automatically unlock or lock the screen.

The ambient light sensor 180L is configured to sense ambient light brightness. The mobile phone 100 may adaptively adjust luminance of the display 194 based on the sensed luminance of the ambient light. The ambient light sensor 180L may also be configured to automatically adjust a white balance during photographing. The ambient light sensor 180L may further cooperate with the optical proximity sensor 180G to detect whether the mobile phone 100 is in a pocket, thereby preventing an accidental touch. The fingerprint sensor 180H is configured to collect a fingerprint. The mobile phone 100 may use a feature of the collected fingerprint to implement fingerprint unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the mobile phone 100 and is at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button, or may be a touch button. The mobile phone 100 may receive a button input, and generate a button signal input related to a user setting and function control of the mobile phone 100. The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The indicator 192 may be an indicator lamp, and may be configured to indicate a charging status and a power change, or may be configured to indicate a message, a missed call, a notification, and the like. The SIM card interface 195 is used to connect to a SIM card. The SIM card may be inserted into the SIM card interface 195 or plugged from the SIM card interface 195, to implement contact with or separation from the mobile phone 100.

It may be understood that the components shown in FIG. 1 do not constitute a specific limitation on the mobile phone. The mobile phone in this embodiment of the present invention may include more or fewer components than those in FIG. 1. In addition, a combination/connection relationship between the components in FIG. 1 may also be adjusted and changed.

The following specifically describes the embodiments of this application with reference to the accompanying drawings. An example in which the electronic device is the mobile phone 100 is used in the following embodiments.

Embodiment 1

Figure 2:
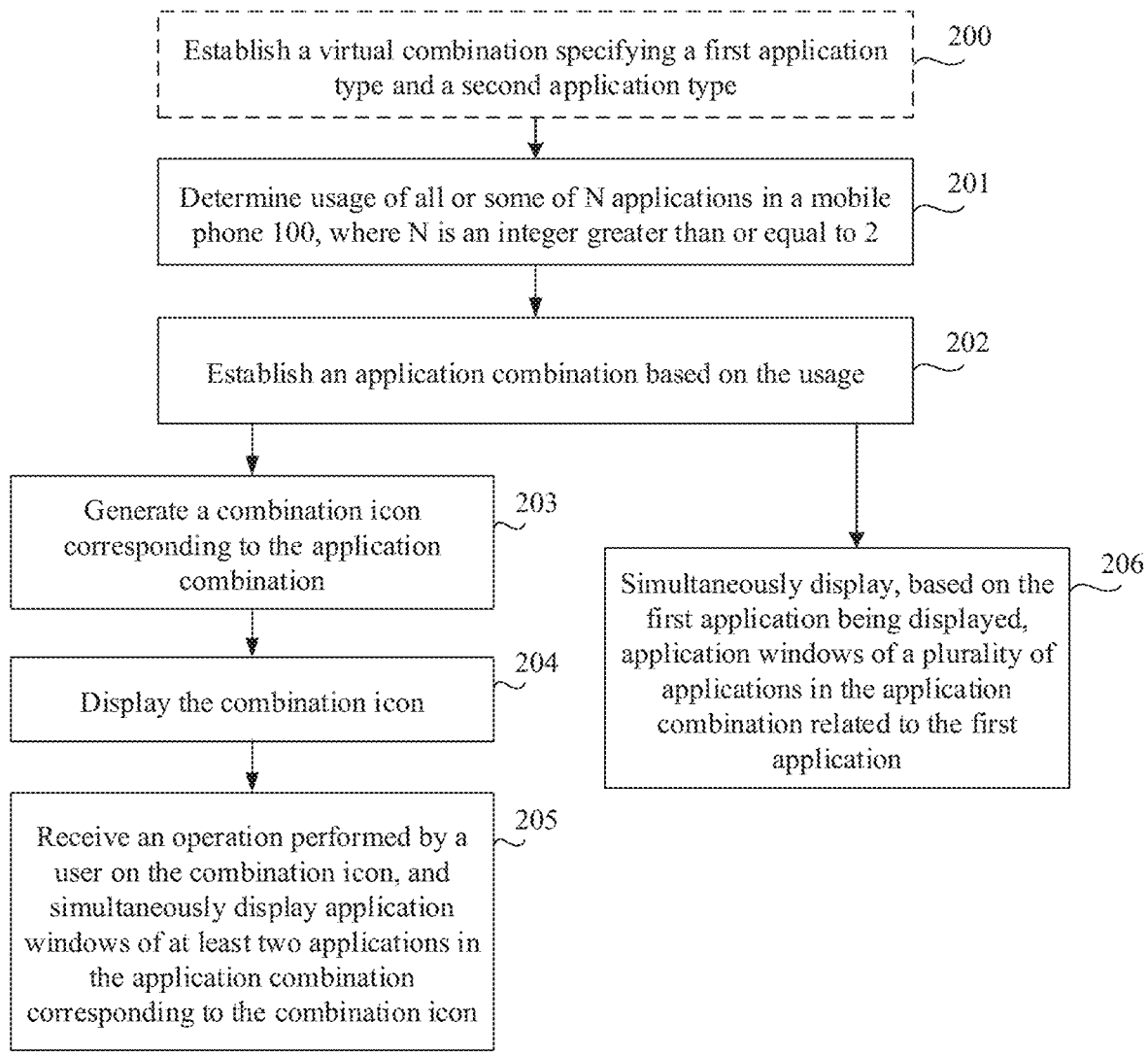
FIG. 2 is a schematic flowchart of an application combination establishment method according to an embodiment of this application.

In this embodiment, the mobile phone 100 may establish an application combination based on usage of an application by a user, and the user does not need to select from a plurality of applications or application icons. In this way, a speed and efficiency of establishing a combination are improved. Specifically, as shown in FIG. 2, a procedure of the application combination establishment method in this example may include the following step 201 and step 202.

Step 201: Determine usage of all or some of N applications in the mobile phone 100, where N is an integer greater than or equal to 2.

Usage of an application by the user may include: a quantity of times of using the application, usage duration, a usage time, a quantity of times of switching the application, simultaneously being displayed together with another application, (for example, simultaneously displaying application windows of a plurality of applications), and the like. For example, the usage of the application by the user may include a quantity of using times within preset duration, usage duration, a usage time, and/or a quantity of times of switching the application. Alternatively, the usage of the application by the user may include: currently displaying application windows of at least two applications simultaneously.

The preset duration may be set before delivery of the mobile phone 100, or may be defined by the user. This is not limited in this embodiment of this application. The preset duration may be one or several hours, one day (for example, 24 hours), three days, one week (for example, 7 days), or the like.

The quantity of times of using the application may be a quantity of times of starting the application (for example, the application changes from stopping to running), or may be a quantity of times of running the application in the foreground. The preset quantity of times may be three times, four times, or another quantity of times.

A start point and an end point of the usage duration of the application may be a moment at which the application is started and a moment at which the application exits, respectively. Within the usage duration, the application may run in the foreground or in the background. Alternatively, the usage duration of the application may be a duration in which the application runs in the foreground from starting to exiting.

The quantity of switching times may be a quantity of times that the first application is switched to the second application, a quantity of times that the second application is switched to the first application, or a sum of the foregoing two types of switching times. Switching from the first application to the second application refers to switching the first application currently running in the foreground to running in the background, and switching the second application currently running in the background to running in the foreground. For example, if a quantity of times that a WeChat application is switched to iQIYI is two, and a quantity of times that iQIYI is switched to WeChat is three, a quantity of times of switching between WeChat and iQIYI that is determined by the mobile phone may be two, three, or five. The mobile phone may determine the foregoing usage when a trigger condition is met or within preset duration after a trigger condition is met.

The trigger condition includes that a preset moment arrives or a preset input operation is detected. The preset moment may be a moment at which a period arrives. The preset input operation may be voice input, an operation on a specified control (for example, double-clicking a power button), or gesture input. The foregoing voice input may be a voice such as "automatically generating a combination icon". The foregoing designated control may be a physical button, or may be a virtual button on the display. The foregoing gesture input may be multi-finger sliding. If the following steps or embodiments are described, the preset input operation may alternatively be the input operation in these steps or embodiments. In this embodiment of this application, a moment at which a preset input operation is detected is referred to as a detection moment.

For example, the mobile phone 100 may start to record usage of the application before a preset moment (for example, 00:00 every day). In this step, the mobile phone 100 may automatically determine, at the preset moment, the usage within preset duration before the preset moment. The end point of the preset duration herein may be the preset moment.

Optionally, the mobile phone 100 may start recording usage of the application after the preset moment. In this step, the mobile phone 100 may determine, within preset duration after the preset moment, the usage within the preset duration. The start point of the preset duration herein may be the preset moment.

Optionally, the mobile phone may start recording the usage of the application before detecting the preset input operation. In this step, the mobile phone 100 may automatically determine, at the detection moment, the usage within preset duration before the detection moment. The end point of the preset duration herein may be the detection moment.

Optionally, the mobile phone may start recording the usage of the application after detecting the preset input operation. In this step, the mobile phone 100 may determine, within preset duration after the detection moment, the usage within the preset duration. The start point of the preset duration herein may be the detection moment.

Optionally, before performing step 201, the mobile phone 100 may further perform step 200 of establishing a virtual combination.

The virtual combination corresponds to the specified application type. The specified application type includes at least two different application types. The application type may include video applications (for example, iQIYI, KuGou, YouTube, and Twitter), instant messaging applications (for example, WeChat, QQ, WhatsApp Messenger, and Line), office applications (for example, Word and Mailbox), and the like. It should be noted that a type name of the application type (for example, video applications and instant messaging applications) may be manually named by the user, or may be set by default before the mobile phone 100 is delivered from the factory. An application type to which each application in the mobile phone 100 belongs may be specified by the user, or may be identified by the mobile phone 100 itself (for example, the application type of the application is determined based on a primary function of the application). This is not limited in this embodiment of this application.

It may be understood that, when establishing the "virtual combination", the mobile phone determines only application types (for example, a first application type and a second application type) to be included in the virtual combination. Applications belonging to the first application type and applications belonging to the second application type have not been included in an application combination established based on the virtual combination. An application belonging to the first application type is also referred to as an application of the first type. An application belonging to the second application type is also referred to as an application of the second type.

The mobile phone may perform step 200 based on an operation of the user. For example, the mobile phone 100 may provide type identifiers of different application types for the user to select, and the mobile phone 100 may establish, as one virtual combination, a plurality of application types corresponding to a plurality of type identifiers selected by the user. For example, the mobile phone 100 may establish the video application and the instant messaging application as one virtual combination based on selection by the user. Alternatively, the virtual combination may be set before the mobile phone 100 is delivered from the factory.

When a virtual combination exists, step 201 performed by the mobile phone 100 may include: determining usage of one or more applications of the first type by the user, and determining usage of one or more applications of the second type by the user. A manner of determining the usage of the applications of the first type and/or determining the usage of the applications of the second type is the same as the manner described above.

Optionally, between step 200 and step 201, the mobile phone 100 may display a virtual combination icon of a virtual combination. In this case, the preset input operation included in the foregoing trigger condition may alternatively be an operation performed by the user on the virtual combination icon.

Step 202: Establish an application combination based on the foregoing determined usage.

Specifically, the mobile phone establishes, as an application combination, at least two applications whose usage meets the preset condition. The following uses three examples to illustrate.

Example 1: The mobile phone 100 may automatically establish, as an application combination, at least two applications whose quantity of using times, usage duration, or quantity of switching times meets the preset condition. The preset condition herein may include: a maximum quantity of using times or reaching a preset quantity of using times, maximum usage duration or reaching a usage duration threshold, or a maximum quantity of switching times or reaching a preset quantity of switching times. For example, the mobile phone 100 may automatically set applications that are used or switched for three times each day as one application combination. Alternatively, the mobile phone 100 may automatically set at least two applications whose daily usage duration reaches 1 hour as one application combination. Alternatively, the mobile phone 100 may automatically set a plurality of applications that are used for a maximum quantity of times or are switched for a maximum quantity of times each day as one application combination. Alternatively, the mobile phone 100 may set a plurality of applications that are used for maximum usage duration each day as one application combination.

The preset quantity of using times, the preset quantity of switching times, and/or the usage duration threshold may be set before delivery of the mobile phone 100, or may be defined by the user. This is not limited in this embodiment of this application. The preset quantity of using times may be three times, four times, or another quantity of times. The preset quantity of switching times may be two times, four times, or another quantity of times. The usage duration threshold may be one hour, several hours, or another duration value.

Example 2: The mobile phone 100 may automatically establish, as an application combination, at least two applications whose usage time meets a preset condition. The preset condition herein may be that the usage time is within preset duration before a current moment. In other words, the application that meets the preset condition may be an application that has been used within preset duration before the current moment. The preset duration herein may be shorter than the preset duration related to the quantity of using times, the usage duration, or the quantity of switching times. Therefore, an application that meets the preset condition herein may be understood as a recently used application. If the preset duration is 10 minutes, and the current moment of the mobile phone 100 is 12:00, an application that is used between 11:50 and 12:00 is a recently used application. For example, if the first application is used at 11:50, and the second application is used at 11:55, the first application and the second application meet the preset condition. The foregoing current moment may be the preset moment or the detection moment in step 201.

If there are three or more applications that meet the preset condition in Example 1 or Example 2, the mobile phone 100 may set all of the three or more applications as one application combination, or may set two of the applications as one application combination. This is not limited in this embodiment of this application. In addition, the preset conditions in Example 1 and/or Example 2 may be randomly combined, that is, the mobile phone 100 may automatically set at least two applications that meet a plurality of conditions as one application combination. For example, the mobile phone 100 may set an application combination based on the quantity of using times and the quantity of switching times, or may set an application combination based on the quantity of using times and the usage time. When conditions are combined, preset duration in one condition may be the same as or different from preset duration in another condition.

Example 3: The mobile phone 100 may establish a plurality of applications that are being displayed as one application combination.

Specifically, when the mobile phone 100 displays application windows of N applications (for example, N is greater than or equal to 2) by area, if the mobile phone 100 detects a preset input operation, the mobile phone 100 automatically establishes the N applications as one application combination. Optionally, the mobile phone 100 may select some applications from the N applications, and establish the selected applications as an application combination. The mobile phone 100 may select from the N applications based on one or more conditions in the foregoing Examples 1 to 2. Alternatively, the mobile phone 100 may select from the N applications based on a user operation. For a description of the input operation, refer to the description in step 201. Details are not described herein again.

Figure 3B:
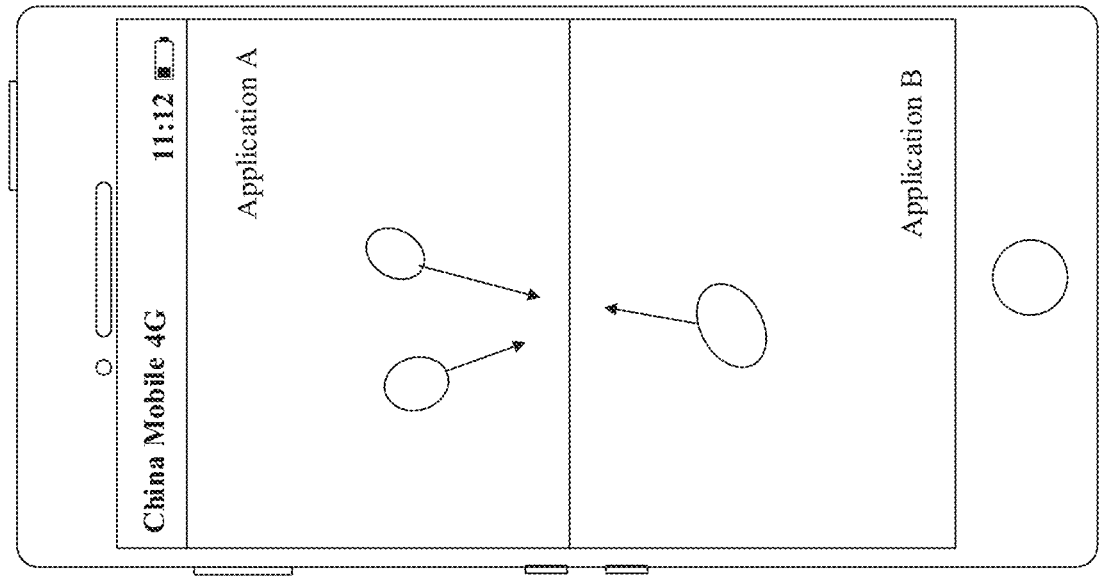
FIG. 3(a) and FIG. 3(b) are a schematic diagram of a scenario in which a plurality of applications that are being displayed are established as one application combination according to an embodiment of this application.
Figure 3A:
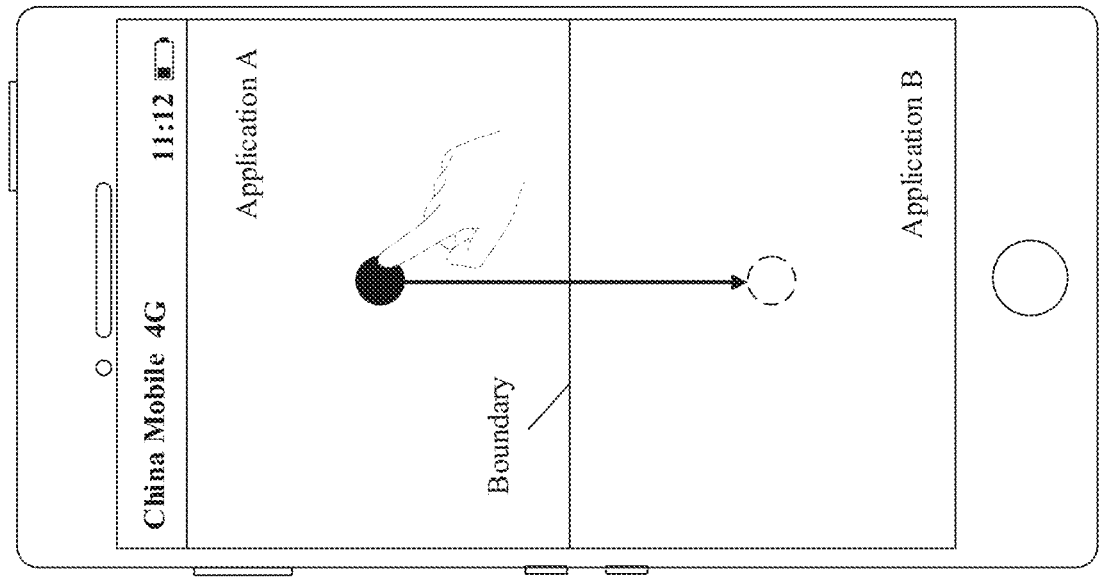

For example, as shown in FIG. 3(a) and FIG. 3(b), an application window of an application A and an application window of an application B are displayed by area on the display of the mobile phone 100. If the mobile phone 100 detects a preset input operation, the mobile phone 100 establishes the application A and the application B as an application combination. In addition to the input operation mentioned in step 201, the preset input operation herein may also be an operation of sliding from the application window of the application A to the application window of the application B shown in FIG. 3(a), or a pitch-in (Pitch-in) operation shown in FIG. 3(b).

Optionally, if the mobile phone establishes the virtual combination, and determines the usage of the application of the first type and the application of the second type in step 201, the mobile phone determines, in the manner of any one of the foregoing examples 1 to 3, the application of the first type that meets the condition and the application of the second type that meets the condition, and establishes an application combination with the application of the first type and the application of the second type that meet the condition. In other words, the mobile phone 100 selects only an application whose application type meets the specified application type.

For example, the mobile phone 100 establishes a video application and an instant messaging application as one virtual combination, and the mobile phone 100 is installed with Line and WeChat that belong to the instant messaging application, and iQIYI and Tencent Video that belong to the video application. If the mobile phone 100 detects that usage duration of iQIYI is greater than usage duration of Tencent Video within a preset time (that is, the usage duration of iQIYI is the longest or longer), it is determined that an application that meets the condition in the video applications is iQIYI. If the mobile phone 100 detects that usage duration of WeChat is greater than usage duration of Line within the preset time (that is, the usage duration of WeChat is the longest or longer), it is determined that an application that meets the condition in the instant messaging applications is WeChat. Correspondingly, the mobile phone establishes iQIYI and WeChat as one application combination.

Optionally, when the at least two applications are established as one application combination, the mobile phone 100 may further store a layout between the at least two applications, where the layout may include display positions, display areas, and/or the like of application windows of the two applications. The layout may be a layout used when the mobile phone 100 detects the preset input operation, for example, a layout of a plurality of application windows that are being displayed when the preset input operation is detected in the foregoing Example 3.

It is assumed that a combination of the applications A and B already exists and that a layout (first layout) of the applications A and B is stored. If the mobile phone 100 simultaneously displays the applications A and B again, the user adjusts the display layout of the two applications (an adjusted layout is a second layout), and the mobile phone detects the preset input operation. In this case, the mobile phone 100 may store the layout of the application combination in the following two manners.

Manner a: For one application combination, the mobile phone 100 stores only one layout. In other words, the mobile phone replaces the first layout with the second layout. In this manner, storage space of the storage layout can be saved.

Manner b: For one application combination, the mobile phone 100 stores a plurality of layouts. In other words, the mobile phone 100 stores the second layout and retains the stored first layout. In this manner, the mobile phone may directly display the application windows of the plurality of applications based on the layout selected by the user in a subsequent step, and the user does not need to manually adjust the layout. Therefore, display efficiency of the application windows may be improved.

Optionally, a quantity threshold may be set for the application combination. The quantity threshold of the application combination may be set by a user, or may be set before delivery. Correspondingly, when establishing the application combination in any manner in any example in step 202, the mobile phone further determines whether a quantity of currently existing combinations has reached a combination quantity threshold. If the quantity of currently existing application combinations does not reach the quantity threshold, the mobile phone 100 may establish a new application combination. If a quantity of currently existing combination icons has reached a threshold of a quantity of combination icons, the mobile phone 100 may update the existing application combination. The updated application combination is the application combination established in step 202.

For example, it is assumed that the quantity threshold of the combinations is 1 and the mobile phone has established a combination 1 including the application A and the application B based on the quantity of times of using the applications. If the mobile phone detects that a quantity of times of using an application C also meets the condition, and both the quantity of times of using the application C and a quantity of times of using the application A are respectively greater than a quantity of times of using the application B, the mobile phone updates the combination 1 to a combination 2, where the combination 2 includes the application A and the application C. Alternatively, the foregoing quantity of using times may be replaced with usage duration, a quantity of switching times, or another usage.

For example, it is assumed that the quantity threshold of the combinations is 3 and application combinations 1 to 3 already exist in the mobile phone. If the mobile phone 100 detects that usage (for example, a quantity of switching times) of the application C and an application D meets the condition, the mobile phone 100 establishes a combination 4 including the application C and the application D, and replaces a combination with the least quantity of times of using the combinations in the combinations 1 to 3 with the combination 4. The quantity of times of using the combination is a quantity of times of simultaneously displaying application windows of at least two applications in the application combination.

Embodiment 2

This embodiment includes the content in the foregoing Embodiment 1. On the basis of Embodiment 1 (specifically after step 202), the method in this embodiment may further include the following steps 203 to 205.

Step 203: Generate a combination icon corresponding to the application combination.

The user may operate the generated combination icon, so as to start and/or simultaneously display a plurality of applications included in the application combination corresponding to the combination icon. A specific start-up and/or display manner will be described in detail in the following step 205.

Optionally, the combination icon may reflect applications included in the application combination. For example, the combination icon may include an application identifier of each application. The application identifier includes but is not limited to an icon of an application, a screenshot of an application interface, a card, and/or a text. The combination icon may directly reflect an application included in the application combination, so that the user can quickly determine whether to start and/or simultaneously display a plurality of applications. If there are a plurality of such combination icons, the user can quickly decide which combination to select without having to operate the combination icons one by one until a desired application combination is found.

As mentioned in step 202, the mobile phone 100 may further save the layout of the application when establishing the application combination. Therefore, optionally, the mobile phone may generate the combination icon based on the stored layout, so that the combination icon may reflect layouts of at least two applications corresponding to the combination icon. A position relationship between at least two application identifiers in the combination icon may be related (for example, the same) to a display position relationship of application windows of the at least two applications. For example, if an application window of an application in the saved layout is displayed in a left area of the display, an identifier of the application in a combination icon is also located in a left part of the combination icon. Optionally, areas occupied by at least two identifiers in the combination icon may be related (for example, the same) to display areas occupied by application windows of the at least two applications. For example, if a display area of an application window of an application in the saved layout is greater than an area of an application window of another application, an area occupied by an identifier of the application in the combination icon is greater than an area occupied by an identifier of the another application.

Figure 4A:
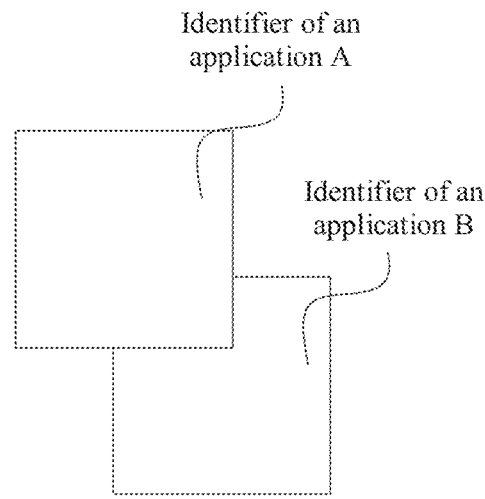
FIG. 4A is a schematic diagram of a combination icon according to an embodiment of this application.

It is assumed that the saved layouts of the application A and the application B are shown in FIG. 3(*a*), that is, the application window of the application A is displayed above, the application window of the application B is displayed below, and display areas of the application window of the application A and the application window of the application B are the same. Correspondingly, combination icons generated by the mobile phone 100 may be shown in FIG. 4A, that is, in the combination icon, an identifier of the application A is located above, an identifier of the application B is located below, and areas of the identifier of the application A and the identifier of the application B are the same.

Figure 4B:
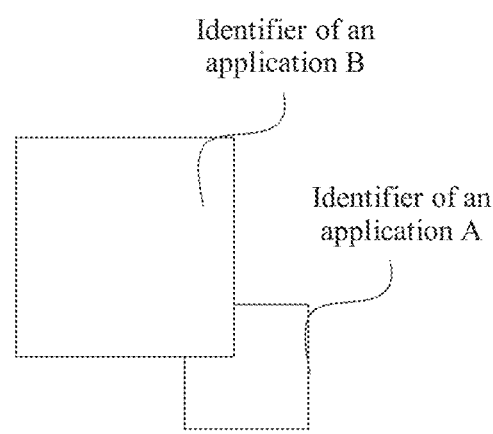
FIG. 4B is a schematic diagram of another combination icon according to an embodiment of this application.

If the display area of the application window of the application B in FIG. 3(*a*) is changed to be greater than the display area of the application window of the application A, the generated combination icon may be shown in FIG. 4B, that is, in the combination icon, the identifier of the application B is located above, the identifier of the application A is located below, and the area of the identifier of the application A is greater than the area of the identifier of the application B.

As described in step 202, a manner of saving the layout of the application combination may include a manner a and a manner b. Correspondingly, manners of generating the combination icon in this step are also different.

In the case of the manner a, a manner of generating the combination icon in this step is: replacing an existing combination icon that reflects the first layout with a combination icon that reflects the second layout manner. In other words, a combination icon of a same application combination is not fixed, but may dynamically change as the user adjusts the layout. In this manner, a quantity of combination icons can be reduced, and the user does not need to select from a plurality of combination icons, and the user does not need to distinguish which combination icons have different layouts corresponding to a same combination during selection. Therefore, speed and efficiency of starting and/or simultaneously displaying applications in the combination can be improved.

In the case of the manner b, a manner of generating the combination icon in this step is the following b1 or b2.

Manner b1 includes: adding a combination icon that reflects the second layout. In other words, the mobile phone may generate, for a same application combination, at least two combination icons that reflect different layout manners. In this way, the user may select a combination icon that reflects a specific layout manner, so as to directly simultaneously display a plurality of applications in the layout manner. In this way, a display speed of the applications is improved.

Manner b2 includes: setting an original combination icon that reflects the first layout as a first sub-icon of the combination, and generating, for the combination, a combination icon that does not reflect the layout manner and a second sub-icon that reflects the second layout manner. In this manner, the quantity of combination icons can be reduced. In addition, the user may also select a sub-icon in a subsequent step 205, and directly simultaneously display application windows of a plurality of applications in a layout manner corresponding to the sub-icon, so as to achieve a technical effect of reducing selection difficulty and improving a display speed.

Step 204: Display the combination icon of the application combination.

Figure 5A:
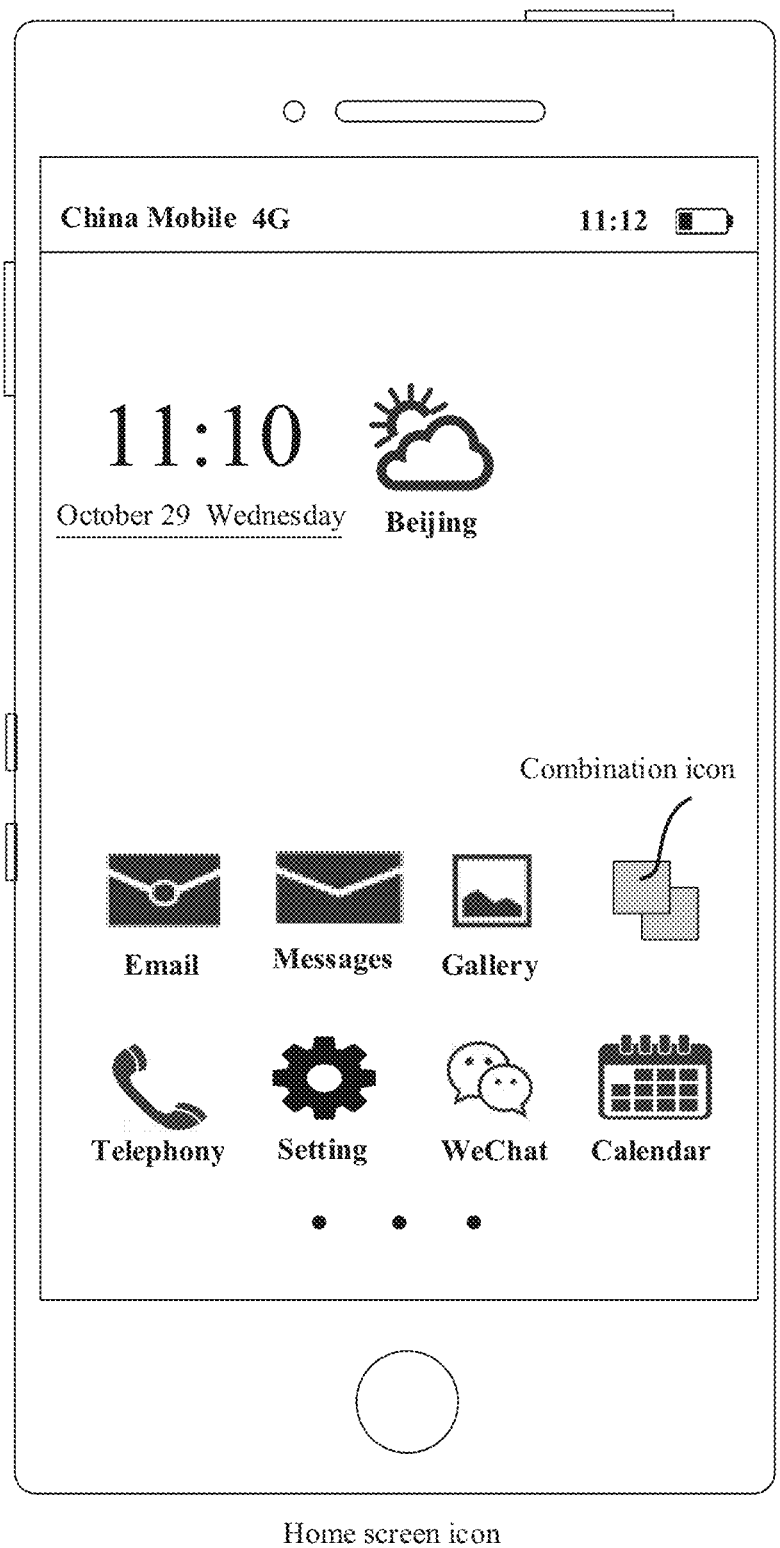
FIG. 5(a), FIG. 5(b) and FIG. 5(c) are schematic diagrams of display positions of a combination icon according to an embodiment of this application.
Figure 5B:
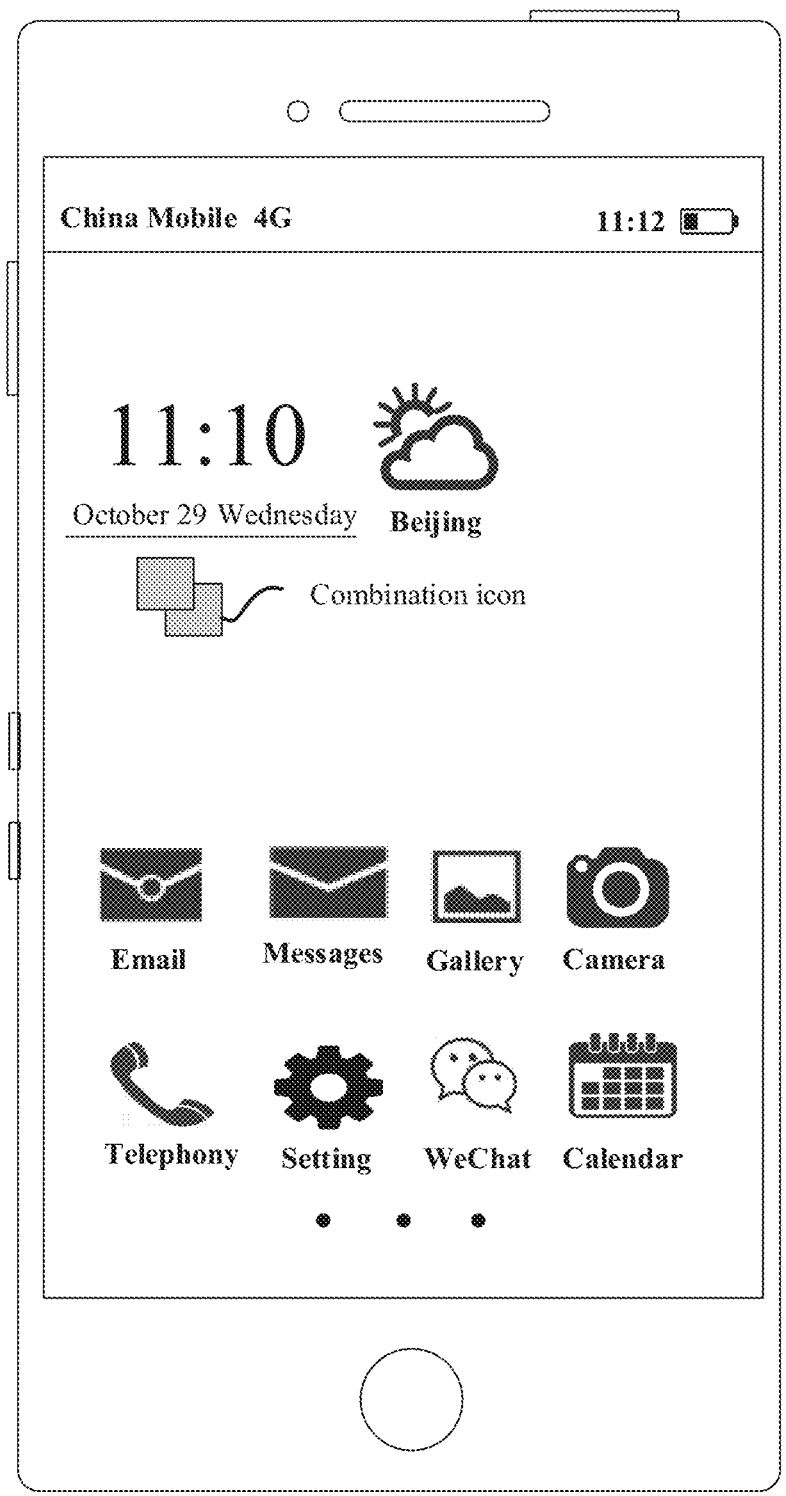
Figure 5C:
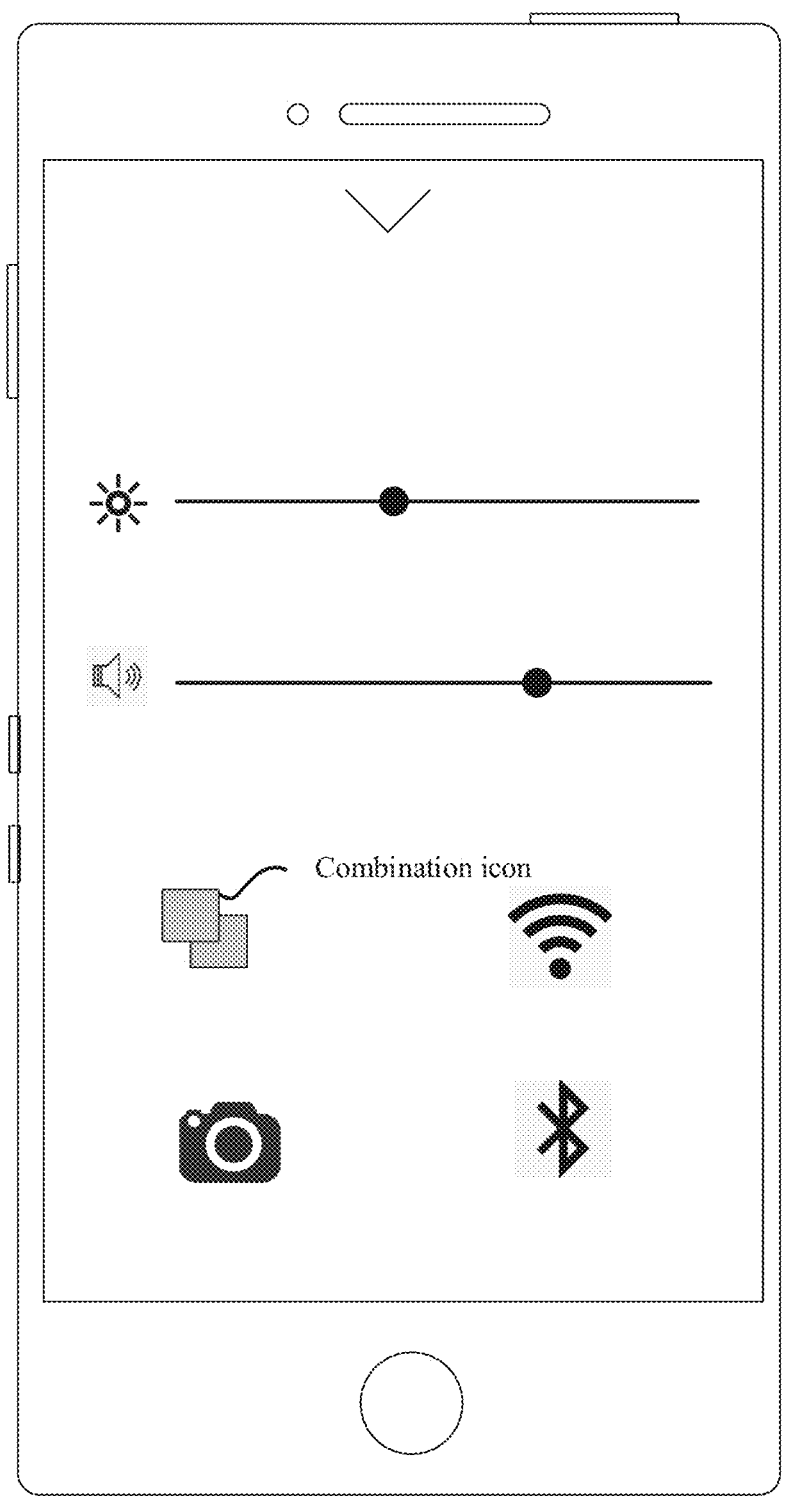

It should be noted that the mobile phone 100 may display the combination icon at any display position. For example, as shown in FIG. 5(*a*), the mobile phone 100 may display a combination icon on a home screen (which may also be referred to as a home). For another example, as shown in FIG. 5(*b*), the mobile phone 100 may display the combination icon by using a home screen widget (Widget). For another example, as shown in FIG. 5(*c*), the mobile phone 100 may display the combination icon in a system shortcut bar. The system shortcut bar may be, for example, a pull-up menu or a pull-down menu on a home screen, where an example of the pull-up menu is used in FIG. 5(*c*). For another example, although not shown in the figure, the combination icon may also be displayed on the leftmost screen or the like. This is not limited in this embodiment of this application.

In the foregoing manner b2, the mobile phone 100 first displays a combination icon that does not reflect a layout manner. After the user performs an operation on the combination icon, a plurality of sub-icons are displayed.

Step 205: Receive the operation performed by the user on the combination icon or the sub-icon, and simultaneously display, based on the operation, application windows of at least two applications in the application combination corresponding to the combination icon.

The operation performed by the user on the combination icon may be tapping (for example, double-clicking or touching and holding) the combination icon.

Figure 6A:
FIG. 6(a) and FIG. 6(b) are a schematic diagram of a scenario in which a plurality of application windows are simultaneously displayed by using a combination icon according to an embodiment of this application.
Figure 6B:
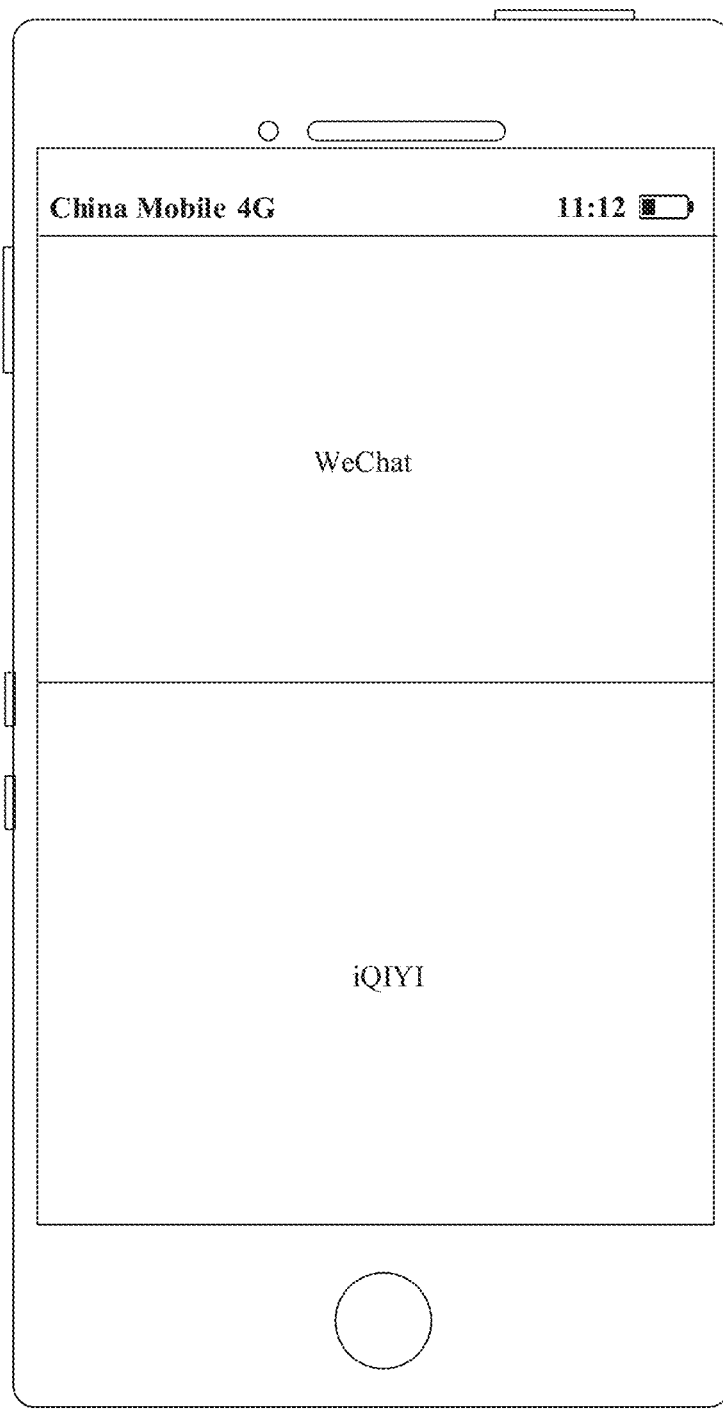

For example, as shown in FIG. 6(*a*), the mobile phone 100 displays a home screen 601, and the home screen 601 includes a combination icon 602 of an application combination. The combination icon 602 corresponds to the application combination of "WeChat" and "iQIYI". When the user taps the combination icon 602, as shown in FIG. 6(*b*), the mobile phone 100 simultaneously displays an application window of WeChat and an application window of iQIYI.

If the mobile phone 100 stores a layout manner of each application in the application combination, the mobile phone displays the application windows of the applications in the stored layout manner.

Optionally, if the mobile phone simultaneously displays a plurality of sub-icons that respectively reflect different layouts in step 204, and the user operates one of the sub-icons in this step, the mobile phone 100 displays windows of a plurality of corresponding applications in a layout manner corresponding to the sub-icons.

Figure 7A:
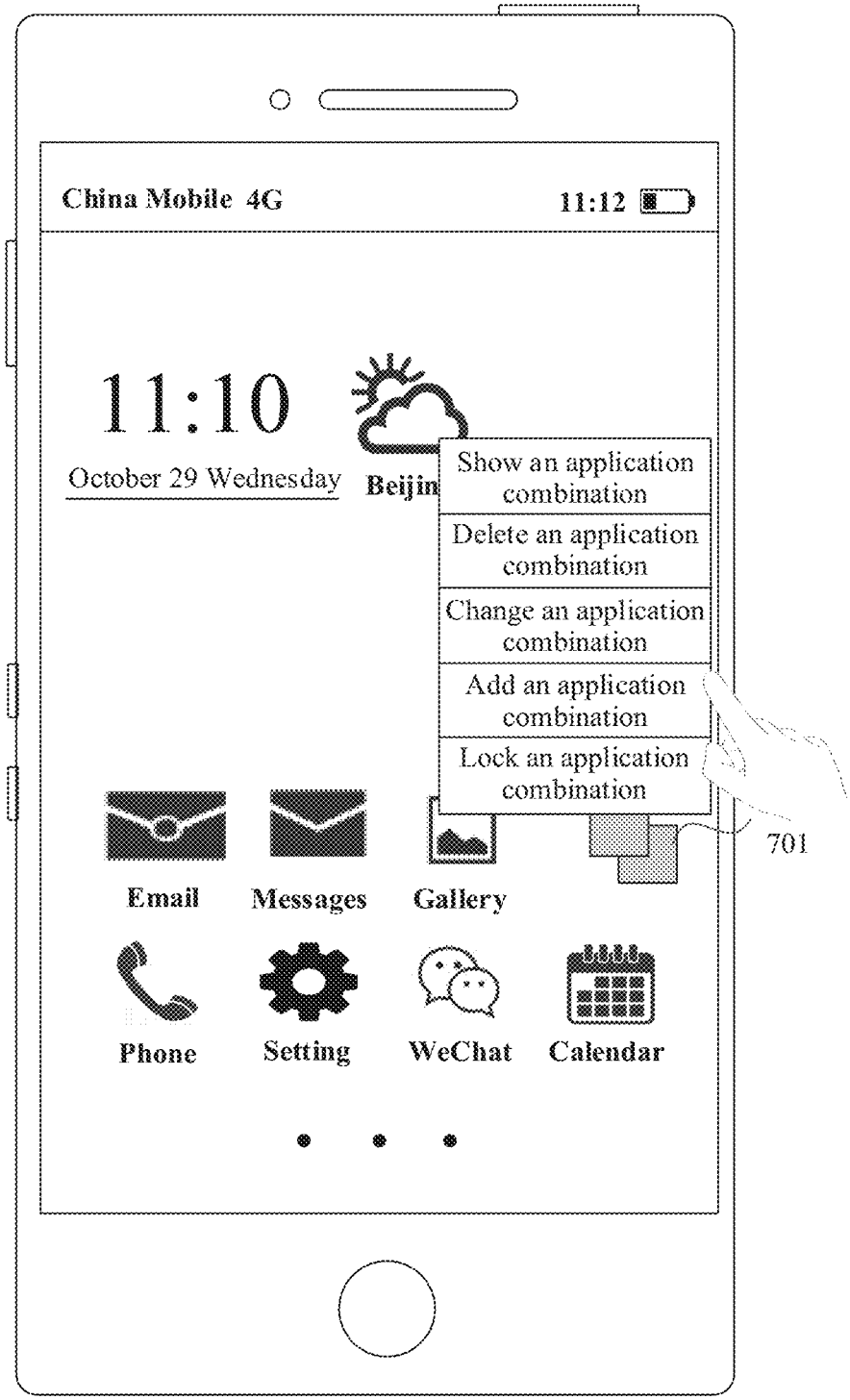
FIG. 7(a) and FIG. 7(b) are a schematic diagram of a scenario in which an application combination is changed, locked, deleted, or added according to an embodiment of this application.

Optionally, in addition to displaying the application windows of the plurality of applications, the mobile phone may further provide another operation option for the user. The display option and the another operational option may be provided to the user by combining icons. As shown in FIG. 7(a), the mobile phone 100 displays a combination icon 701 of an application combination. It is assumed that the application combination herein includes an application X and an application Y. In response to an operation performed by the user on the combination icon 701, such as double-clicking or touching and holding the combination icon 701, the mobile phone 100 may display an option of "Display an application combination". In addition, the mobile phone may display options such as "Delete an application combination", "Change an application combination", "Add an application combination", and/or "Lock an application combination". It may be understood that these operation options are not all necessary, but only one or more of them may be used.

In response to an operation performed by the user on the "Lock an application combination" option, the mobile phone 100 may lock the application X and the application Y. "Locked" indicates that applications in the application combination are fixed as the application X and the application Y, and is not automatically replaced by another application subsequently. For example, the application X and the application Y are not replaced by other applications that meet a preset condition in the manner described in steps 201 to 202.

In response to an operation performed by the user on the "Delete an application combination" option, the mobile phone 100 may delete the application combination and the combination icon thereof. Optionally, after deleting the application combination, the mobile phone may alternatively retain the combination icon of the application combination.

Figure 7B:
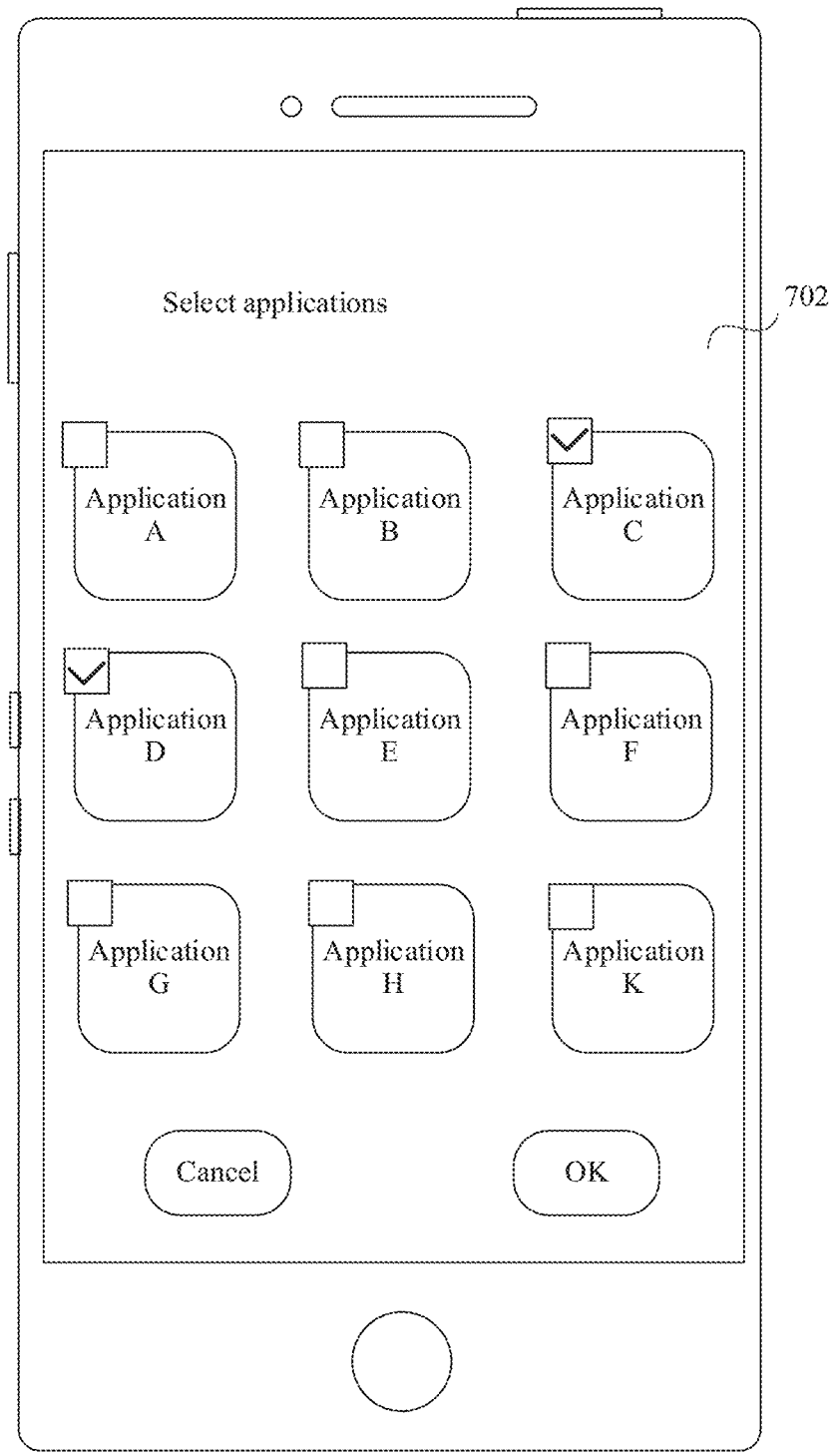

In response to an operation performed by the user on the "Change an application combination" option, the mobile phone 100 may display an application selection interface 702 shown in FIG. 7(b). The user may select an application from the selection interface 702, and replace the application X or the application Y in the application combination with the selected application. Application identifiers displayed on the selection interface 702 may not include application identifiers of the application X and the application identifiers of the application Y, or may include application identifiers of the application X and the application Y.

In response to an operation performed by the user on the "Add an application combination" option, the mobile phone 100 may display an application selection interface 702 shown in FIG. 7(b). The user may select a plurality of applications from the selection interface 702 to establish an application combination. For example, after the user selects an identifier of the application C and an identifier of the application D and taps an "OK" control, the mobile phone 100 establishes the application C and the application D as one application combination, and may add a combination icon of the application combination on the home screen, for example, a combination icon including the identifiers of the application C and the application D.

Optionally, the added or updated application combination may be locked by default in response to the operation performed by the user on the "Add an application combination" option or the "Change an application combination" option. In other words, an application in the added combination or the updated combination is not replaced by another application.

Figure 8A:
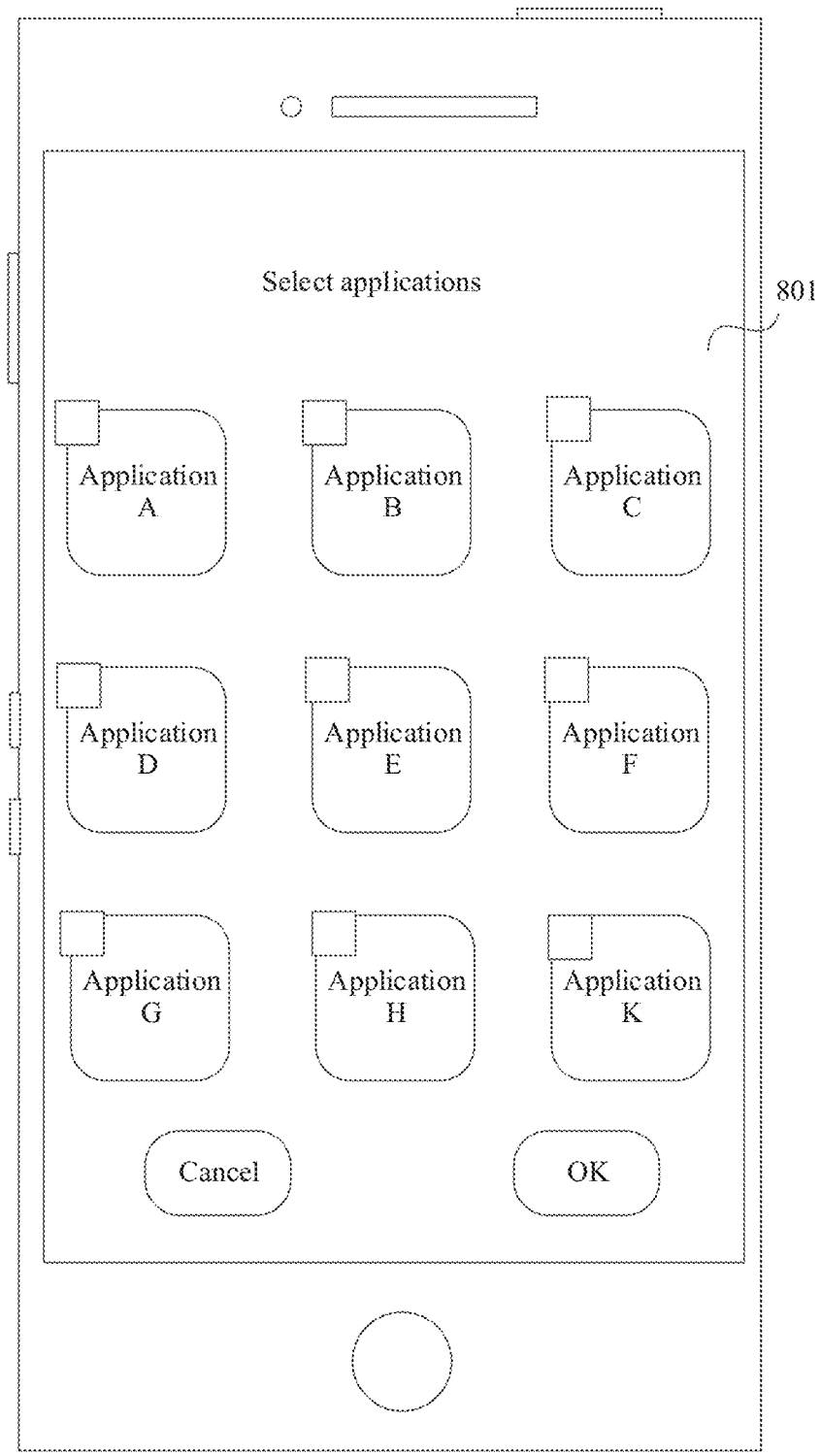
FIG. 8(a), FIG. 8(b), FIG. 8(c) and FIG. 8(d) are a schematic diagram of a scenario in which an established application combination includes an application that has not been installed according to an embodiment of this application.
Figure 8B:
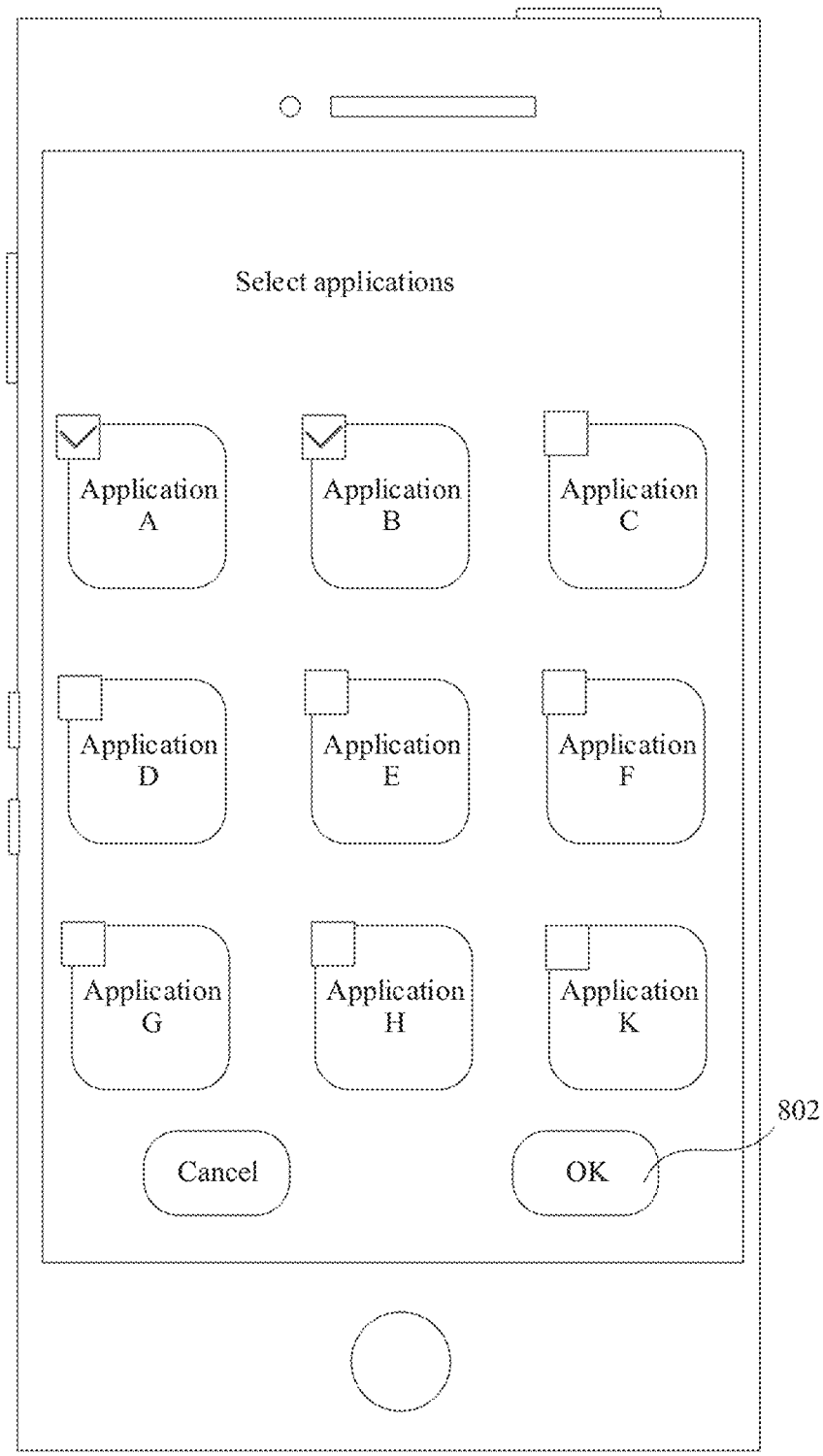

It may be understood that, when adding an application combination or changing an application combination, the mobile phone 100 may select from currently installed applications and currently applications that have not been installed, and then establish the selected applications as one application combination. For example, after the user selects the "Add an application combination" option or the "Update an application combination" option, as shown in FIG. 8(a), the mobile phone 100 displays a selection interface 801, the interface 801 includes identifiers of a plurality of applications, and a selection box may be displayed on an identifier of each application. It should be noted that the application in the interface 801 in FIG. 8(a) may include an application that has not been installed in the mobile phone 100. For example, the "currently application that has not been installed" may be an application that has never been downloaded by the mobile phone 100, and/or an application that has been downloaded by the mobile phone 100 but has been uninstalled, or the like. As shown in FIG. 8(b), the user selects the identifier of the application A and the identifier of the application B in the interface 801, and then, in response to the user clicking the "OK" button 802, the mobile phone 100 establishes the application A and the application B as one application combination, and displays the combination icon of the application combination, for example, 803 in FIG. 8(c).

Figure 8C:
Figure 8D:
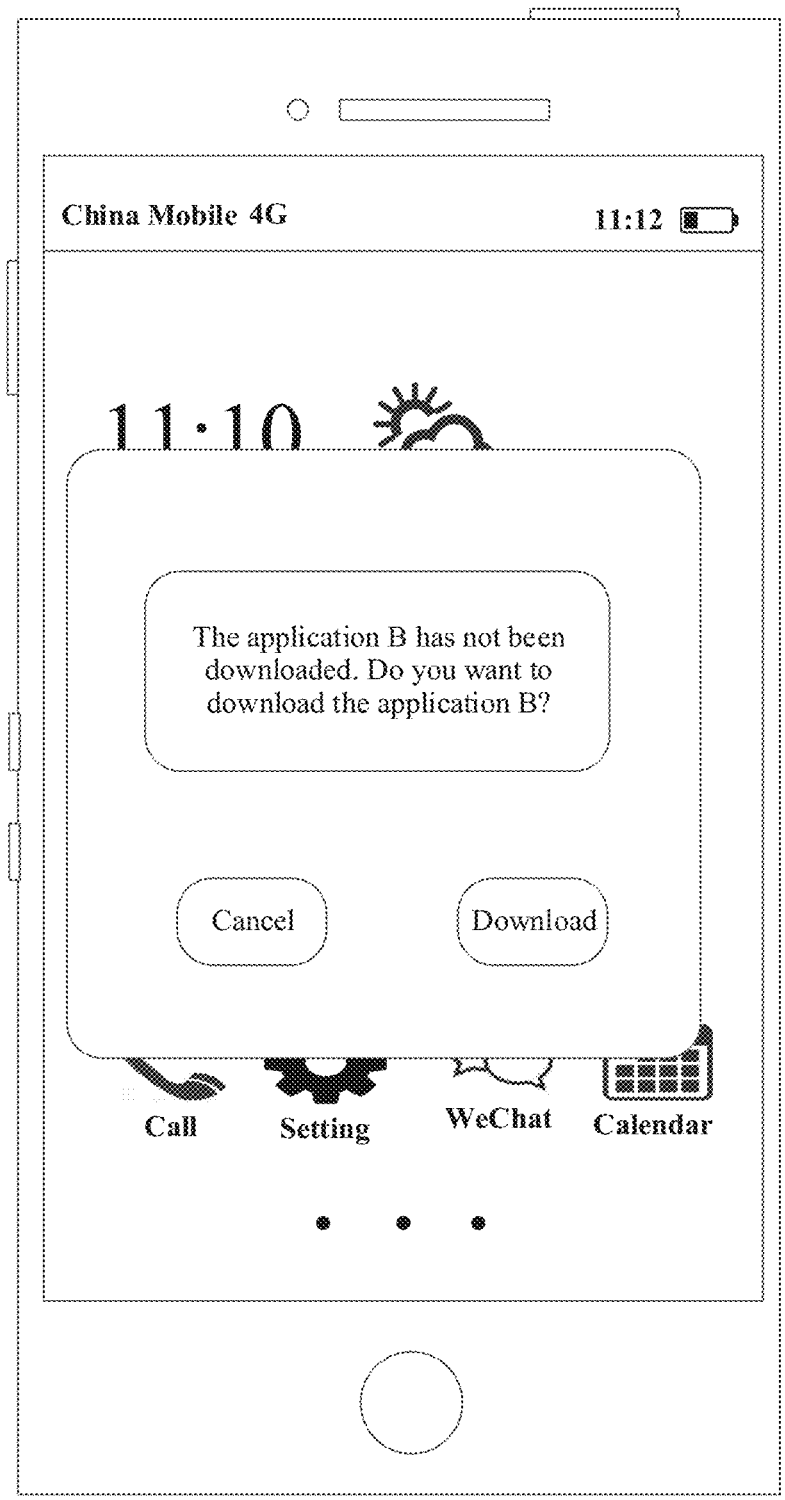

If the application B is an application that has not been installed, the mobile phone 100 may download the application B when establishing the application combination including the application A and the application B. Alternatively, as shown in FIG. 8(c) to FIG. 8(d), the mobile phone may directly download the application B or prompt the user to download the application B only when detecting an operation performed by the user on a combination icon 803.

It may be understood that, in addition to the embodiment shown in FIG. 8(a), FIG. 8(b), FIG. 8(c) and FIG. 8(d), the mobile phone 100 may also prompt the user to download an application in any one of the following scenarios.

Scenario 1: After the mobile phone 100 establishes the combination icon including the application combination of the application A and the application B in the manner of the foregoing step 203, the application B is uninstalled. The mobile phone 100 may continue to display the combination icon, and after detecting an operation performed by the user on the combination icon, the mobile phone 100 may prompt the user to download the application B. Optionally, before uninstalling the application B, the mobile phone 100 may output prompt information. The prompt information is used to prompt the user that the application B and the application A are set to an application combination, and the user is asked to determine whether to continue uninstalling the application B. The application B is uninstalled if the user confirms to uninstall the application B.

Optionally, after uninstalling the application B, the mobile phone may also delete the application combination including the application A and the application B and the combination icon.

Optionally, after uninstalling the application B, the mobile phone 100 may automatically search for the application C, and then establish the application C and the application A as one application combination. The mobile phone may use the manner in the foregoing steps 201 to 202 to "automatically search for the application C" and establish a combination by using the application C and the application A. Correspondingly, when establishing the application combination including the application C and the application A, the mobile phone may generate the combination icon for the application combination in the manner in step 203.

Scenario 2: It is assumed that the mobile phone 100 establishes a virtual combination specifying the first application type and the second application type, and installs an application belonging to the first application type, but does not install an application belonging to the second application type. When the mobile phone 100 displays a virtual combination icon of the virtual combination, and detects an operation performed by the user on the virtual combination icon, the mobile phone 100 may output prompt information to prompt the user to download the application belonging to the second application type.

Embodiment 3

This embodiment includes the content in the foregoing Embodiment 1. On the basis of Embodiment 1 (for example, after step 202), the method in this embodiment may further include step 206. That is, the method in this embodiment of the present invention may include steps 201, 202, and 206, or include steps 200, 201, 202, and 206. Step 206 is described in detail below.

Step 206: Simultaneously display, based on the first application being displayed (for example, the application A), application windows of a plurality of applications in the application combination related to the first application.

Figure 9:
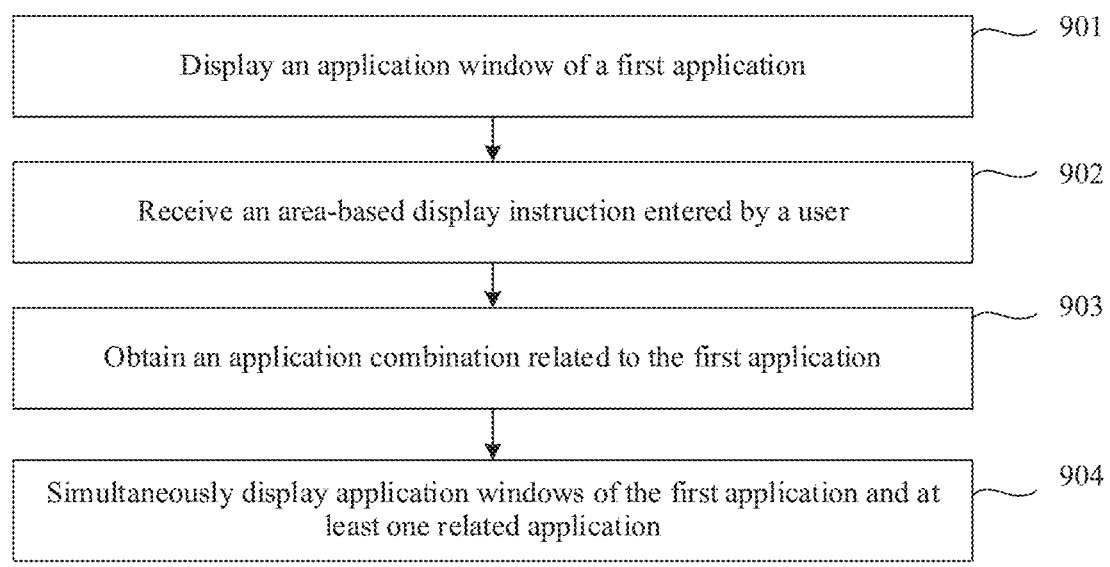
FIG. 9 is a schematic flowchart of a step 206 according to an embodiment of this application.

Specifically, as shown in FIG. 9, step 206 may include the following steps 901 to 904.

Step 901: Display an application window of the first application (for example, the application A).

Figure 10B:
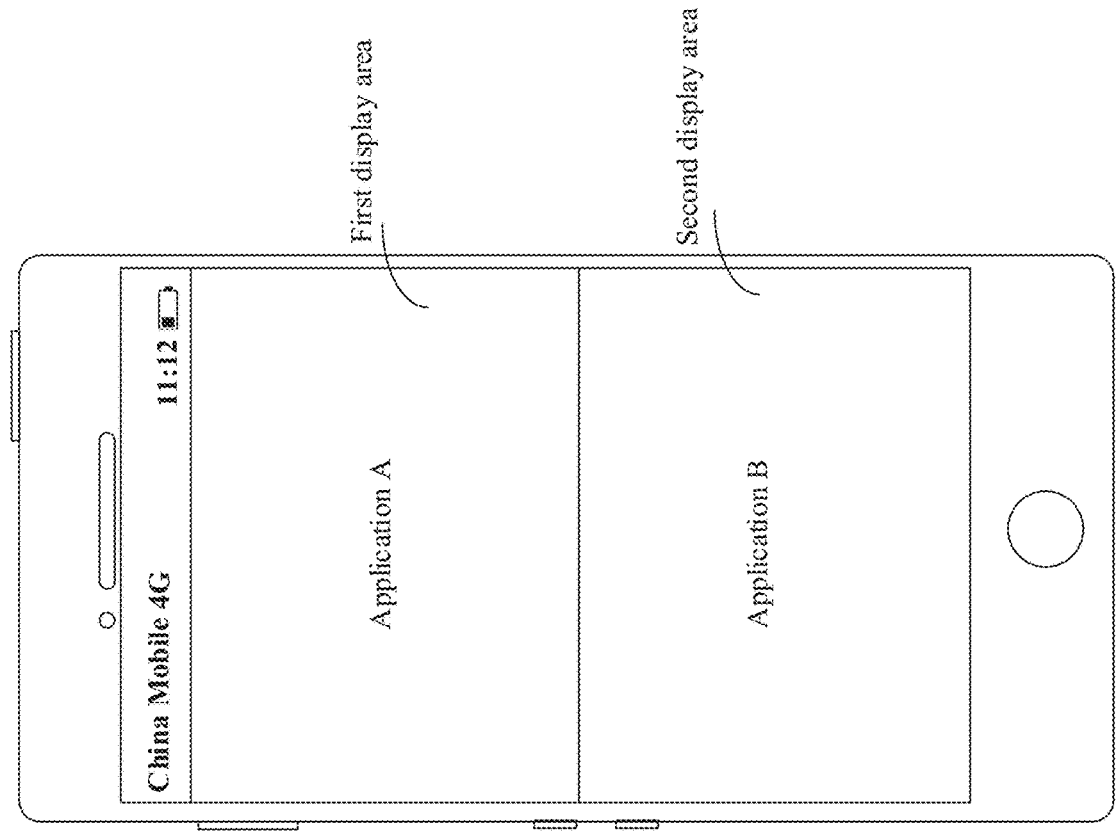
FIG. 10(a) and FIG. 10(b) are a schematic diagram of a scenario of Embodiment 3 according to an embodiment of this application.
Figure 10A:
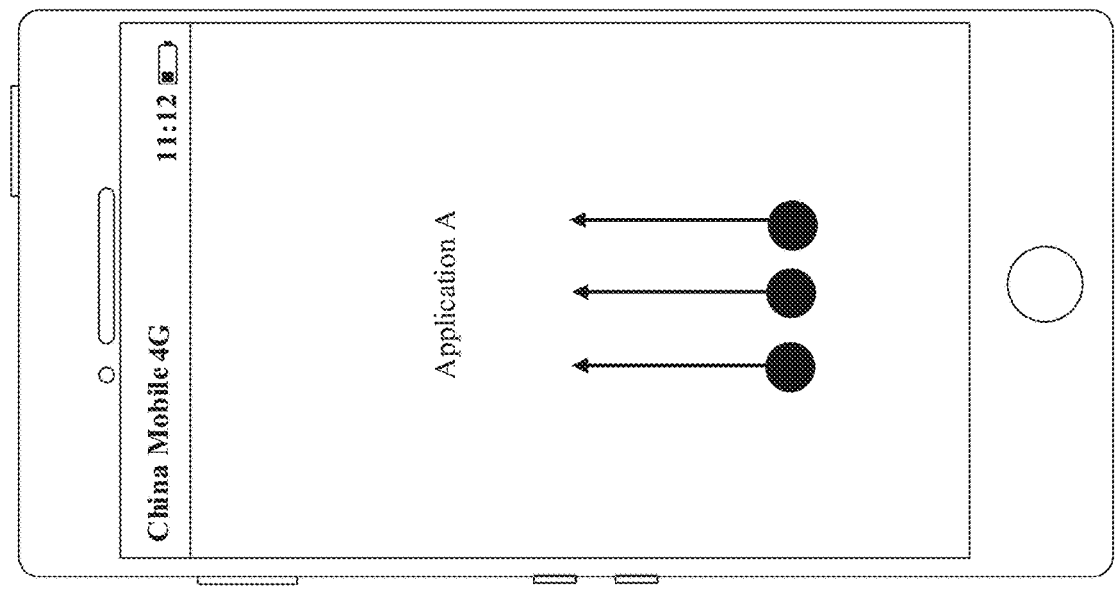

Step 902: Receive an area-based display instruction entered by a user. The user may enter the area-based display instruction by using a gesture (for example, multi-finger upward sliding). As shown in FIG. 10(*a*), the mobile phone 100 displays the application window of the application A, and the mobile phone 100 detects the area-based display instruction (for example, multi-finger upward sliding) entered by the user.

Step 903: Obtain the application combination related to the first application. The application combination related to the first application is an application combination that includes the first application. If the first application is the application A, each of the following application combinations is a related application combination: the application combination including the application A and the application B, the combination including the application A, the application B, and the application C, and the application combination including the application A and the application D. The following describes the "application combination related to the first application" for short as a "related application combination", and another application (an application that is not the first application) included in the related application combination is referred to as a "related application" for short.

Step 904: Simultaneously display application windows of the first application and at least one related application.

It is assumed that the mobile phone obtains only one related application combination in step 903, and the related application combination includes only the first application (for example, the application A) and one related application (for example, the application B). In step 904, the mobile phone 100 may directly and simultaneously display application windows of the first application (for example, the application A) and the related application (for example, the application B), as shown in FIG. 10(*b*).

Figure 12B:
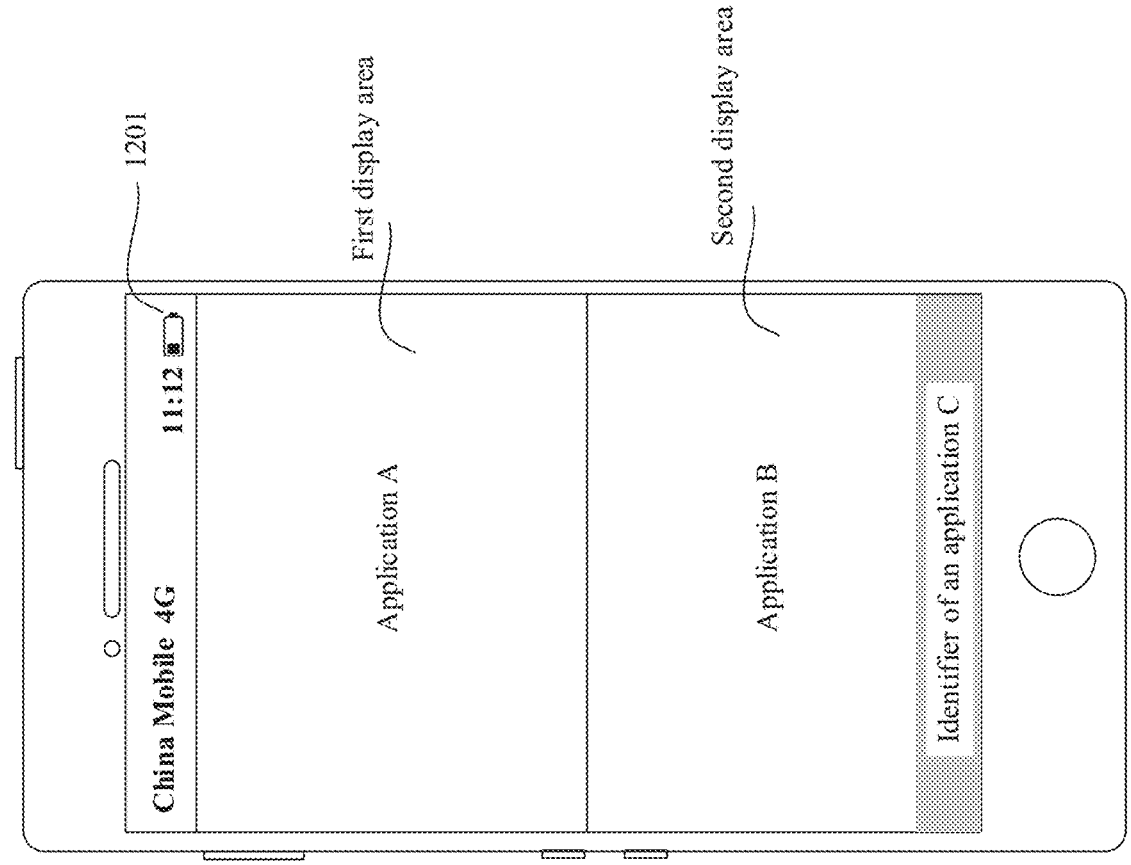
FIG. 12(a) and FIG. 12(b) are a schematic diagram of a second scenario of Embodiment 3 according to an embodiment of this application.
Figure 12A:
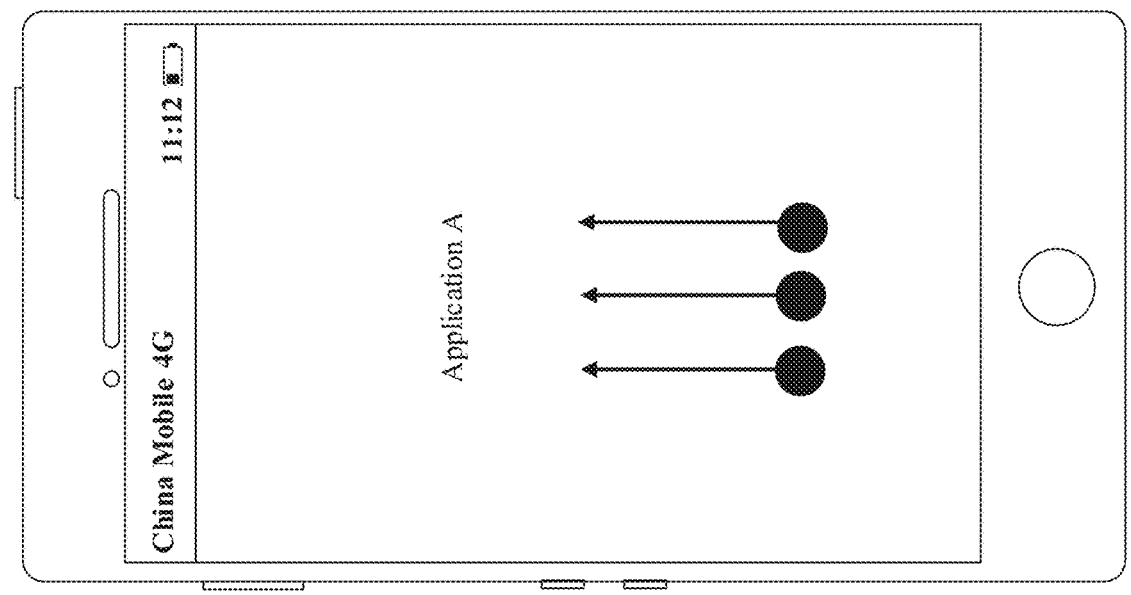

It is assumed that the mobile phone obtains only one related application combination in step 903, and the related application combination includes the first application (for example, the application A) and at least two related applications (for example, the application B and the application C), or the mobile phone obtains a plurality of related application combinations in step 903 (for example, an application combination 1 including the application A and the application B, and an application combination 2 including the application A and the application C). In this step 904, the mobile phone 100 may simultaneously display application windows of the first application and all related applications (for example, as shown in FIG. 11(*a*) and FIG. 11(*b*)). Optionally, the mobile phone may alternatively select, according to the following policy 1 or policy 2, at least one application from related applications (for example, the application B and the application C) for display (for example, as shown in FIG. 12(*a*) to FIG. 14(*b*)).

Policy 1. Determine, based on usage of the related applications, an application for display.

For example, the mobile phone 100 determines the usage of the related applications (for example, usage duration, a quantity of using times, a usage time, or a quantity of switching times) and then selects at least one application from the related applications according to the manner in the foregoing step 202. For example, the mobile phone determines usage duration and/or a quantity of times of using the related application within preset duration before the area-based display instruction is detected, selects, from the related applications, one or more applications with relatively long usage duration and/or a relatively large quantity of times of using the related application, and simultaneously displays application windows of the first application and the selected one or more applications. For a description of the usage and a description of the preset duration, refer to the foregoing steps 201 to 202. Details are not described herein again.

Optionally, when the mobile phone 100 simultaneously displays both the first application and the application windows of the selected one or more applications by area, the mobile phone 100 may further display an identifier of an unselected application. When detecting that the user operates the application identifier of the unselected application, the mobile phone replaces the application window of the selected application that is being displayed with the application window of the unselected application, or displays application windows of the first application (for example, the application A), the selected application (for example, the application B) and the application whose identifier is operated (for example, the application C). For example, as shown in FIG. 12(*a*), the mobile phone 100 displays the application window of the application A The mobile phone 100 detects the area-based display instruction entered by the user. In response to the area-based display instruction, the mobile phone selects, based on usage of the application B and the application C, the application B for area-based display, where the application C is an unselected application. Correspondingly, as shown in FIG. 12(*b*), the mobile phone simultaneously displays the application windows of the application A and the application B and displays an identifier of the application C. Optionally, when the mobile phone 100 detects an operation on the identifier of the application C, the mobile phone 100 may replace the application window of the application B displayed in a second display area with the application window of the application C, or may simultaneously display the application windows of the application C and the application windows of the application B in the second display area, and may continue to display the application window of the application A in a first display area. Optionally, to avoid blocking the application window of the application B, the mobile phone 100 may stop displaying the identifier of the application C. For example, the display is stopped in response to a user operation, or the display is automatically stopped after a preset time.

The identifier of the unselected application (for example, the identifier of the application C) may be displayed in a gray area at the bottom of the second display area shown in FIG. 12(*b*). Optionally, the identifier of the unselected application may be further displayed in another position, for example, 1201, or may be further displayed near a boundary between the application A and the application B.

Optionally, the mobile phone 100 may not display the identifier of the unselected application. For example, if a related application combination includes the first application and a plurality of related applications, and the mobile phone selects one or more related applications (the selected applications) from the related applications for area-based display, the mobile phone 100 may combine identifiers of one or more unselected applications (for example, the application C) that are included in the related application combination with an identifier of the first application (for example, the application A) to generate a temporary identifier, and then display the temporary identifier when displaying the application windows of the first application and the selected application.

If the user performs an operation on the temporary identifier, the mobile phone may simultaneously display application windows of the plurality of applications corresponding to the temporary identifier, that is, application windows of the first application and an unselected application (for example, the mobile phone may simultaneously display the application window of application A and the application window of the application C).

If a related application combination (hereinafter referred to as "unselected application combination") includes the foregoing unselected application (for example, the application C), when displaying the application windows of the first application and the selected application, the mobile phone 100 may display a combination icon of the unselected application combination. If the mobile phone 100 detects an operation performed by the user on the combination icon of the unselected application combination, the mobile phone 100 displays application windows of a plurality of applications (for example, the application A and the application C) in the unselected application combination by area.

It may be understood that the mobile phone may display only the temporary identifier, or may display only the combination icon, or may display both the temporary icon and the combination icon. The mobile phone displays a window of the corresponding application based on the user selection or operation.

Figure 13B:
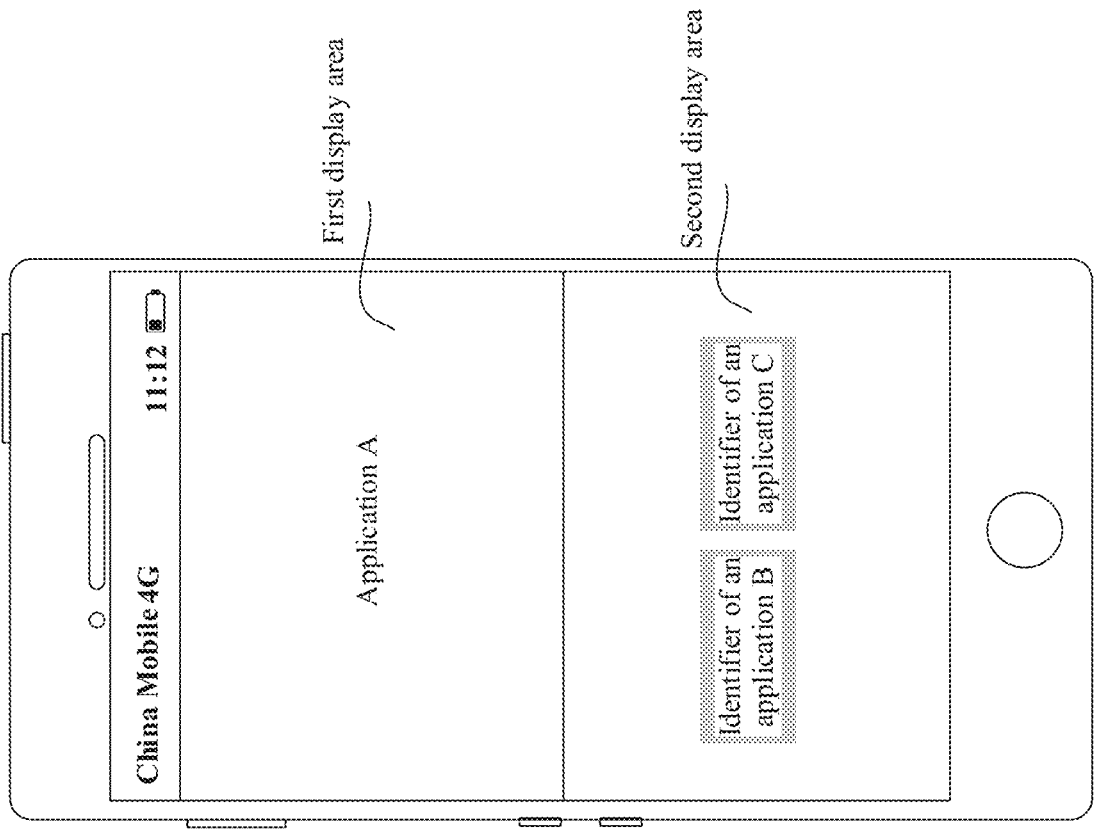
FIG. 13(a) and FIG. 13(b) are a schematic diagram of a third scenario of Embodiment 3 according to an embodiment of this application.
Figure 13A:
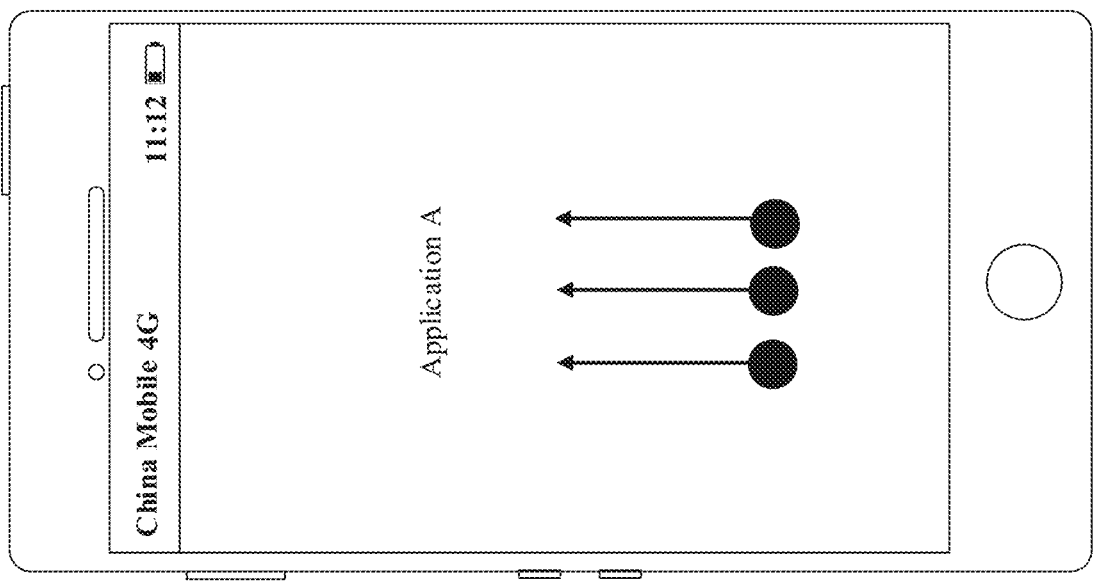

Policy 2: The mobile phone 100 determines, based on a user operation, an application for display. For example, as shown in FIG. 13(*a*), the mobile phone 100 displays the application window of the application A. The mobile phone 100 detects the area-based display instruction entered by the user. In response to the area-based display instruction, the mobile phone displays the interface shown in FIG. 13(*b*). In other words, when displaying the application window of the first application, the mobile phone 100 further displays identifiers of the related applications, for example, an identifier of the application B and an identifier of the application C. If the mobile phone 100 detects an operation performed by the user on an application identifier of a related application (for example, the identifier of the application B), the mobile phone 100 displays the application window of the first application (for example, the application A) and an application window of the related application by area (the related application may be referred to as a selected application, for example, the application B).

The identifier of the related application may be displayed in a central position in the second display area, for example, a gray area in FIG. 13(*b*). Optionally, the identifier of the related application may alternatively be displayed in any other position in the second display area. This is not limited in this embodiment of this application.

Optionally, the mobile phone may not display the identifier of the related application. Alternatively, the mobile phone may display the combination icon of the related application combination, and/or the temporary icon formed by using the identifier of the first application and identifiers of some related applications in a related application combination.

For example, when an application combination of the application A, the application B, and the application C is set on the mobile phone, the mobile phone 100 may display a temporary icon 1 generated by using the identifiers of the application A and the application C, a temporary icon 2 generated by using the identifiers of the application A and the application B, and a combination icon of the application combination. If the mobile phone 100 detects an operation on the temporary icon 1, the mobile phone 100 displays application windows of the application A and the application C by area. If the mobile phone 100 detects an operation on the temporary icon 2, the mobile phone 100 displays application windows of the application A and the application B by area. If the mobile phone 100 detects an operation on the combination icon, the mobile phone 100 displays the application window of the application A, the application window of the application B, and the application window of the application C by area.

Figure 14B:
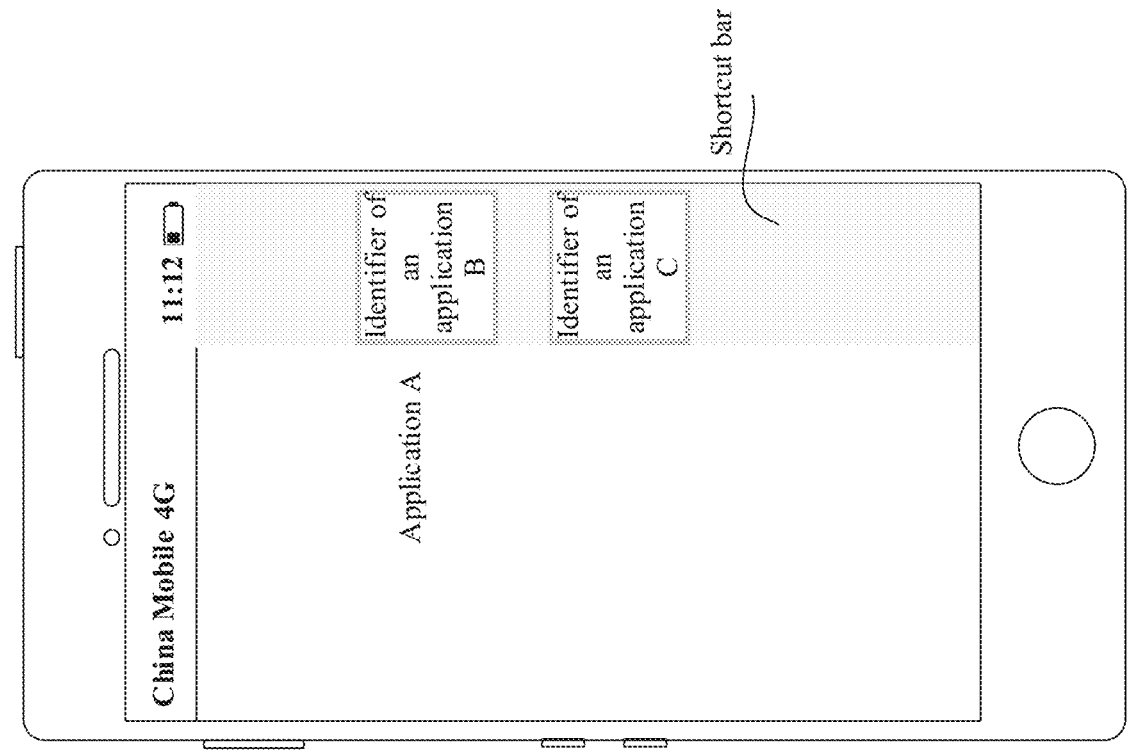
FIG. 14(a) and FIG. 14(b) are a schematic diagram of a fourth scenario of Embodiment 3 according to an embodiment of this application.
Figure 14A:
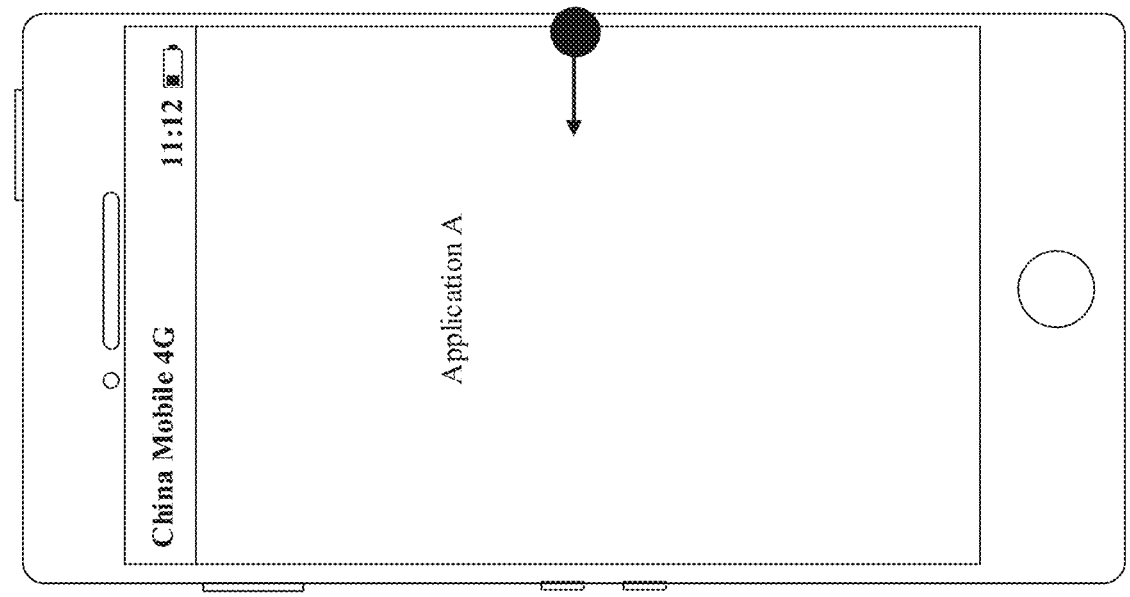

It should be noted that a sequence of the foregoing steps 902 and 903 may be interchanged, that is, step 903 is performed first and then step 902 is performed. For example, the mobile phone may first display an identifier of a related application, and then enter the split-screen mode after the user performs an operation on the identifier of the related application (for example, the identifier of the application B). For example, as shown in FIG. 14(*a*), the mobile phone 100 displays the application window of the application A. The user slides inward from the right edge or the left edge of the application window of the application A. As shown in FIG. 14(*b*), in response to the operation of the user, the mobile phone 10 displays a shortcut bar, where the shortcut bar displays the identifier of the application B and the identifier of the application C. When the mobile phone 100 detects an operation performed by the user on the identifier of the application B in the shortcut bar, the mobile phone 100 enters a split-screen mode, and displays the application windows of the application A and the application B by area. Optionally, the mobile phone 100 may display the shortcut bar based on the start position of the inward sliding operation, for example, when the user slides inward from the left edge, the shortcut bar is displayed near the left edge.

It should be noted that, in the foregoing embodiment, a scenario in which the mobile phone 100 displays the application window of the application A is used as an example for description. It may be understood that the foregoing method is also applicable to the following scenario.

For example, the mobile phone displays the application window of the application A and the application window of the application B.

For example, the mobile phone 100 has established an application combination 1 including the application A, the application B, and the application C, and an application combination 2 including the application A, the application B, and the application D. In the scenario in which the mobile phone 100 displays the application window of the application A and the application window of the application B, the user enters an area-based display instruction, and in response to the area-based display instruction, the mobile phone 100 may enter the split-screen mode, display the application windows of the application A and the application B in the first display area, and display the identifier of the application C and the identifier of the application D in the second display area. If the mobile phone 100 detects an operation on the identifier of the application C, the mobile phone 100 displays the application window of the application C in the second display area. If the mobile phone 100 detects an operation on the identifier of the application D, the mobile phone 100 displays the application window of the application D in the second display area.

It should be noted that the area-based display method is described in the foregoing embodiment by using the established application combination as an example. It may be understood that the foregoing method is also applicable to a virtual combination.

It is assumed that the mobile phone 100 establishes a type virtual combination specifying the first application type and the second application. It is assumed that in applications installed on the mobile phone, the application A and the application B belong to the first application type, and the application C and the application D belong to the second application type. In the following, an application belonging to the first application type is referred to as a "first-type application", and an application belonging to the second application type is referred to as a "second-type application".

When the mobile phone 100 displays an application window of the first-type application (for example, the application A) and detects the area-based display instruction of the user, the mobile phone 100 may use one of the following two manners.

Manner 1: Select one or more second-type applications based on usage of the second-type applications (for example, the application C and the application D), and simultaneously display an application window of the first-type application (for example, the application A) and an application window of the selected application (for example, the application C). For detailed content of selecting the second-type application by the mobile phone 100 based on the usage, refer to the policy 1. Details are not described herein again.

Manner 2: Displays identifiers of all the second-type applications, for example, the identifier of the application C and the identifier of the application D. When detecting an operation performed by the user on the identifier of the second-type application (for example, the identifier of the application C), the mobile phone 100 displays the application windows of the first-type application (for example, the application A) and the second-type application (for example, the application C) by area. For detailed content of selecting the second-type application by the mobile phone based on the operation of the user, refer to the policy 2. Details are not described herein again.

For example, the first application type may be a video type, the second application type may be an instant messaging type, the first application type may include Tencent Video and iQIYI, and the second application type may include WeChat and Line.

It should be noted that the method in this embodiment is applicable to a foldable electronic device, for example, a foldable mobile phone. For example, FIG. 15(a) and FIG. 15(b) are a schematic diagram of a foldable mobile phone. The foldable mobile phone includes a flexible screen, and the flexible screen may include a bent part, a first display area, and a second display area. As shown in FIG. 15(a) and FIG. 15(b), the flexible screen is divided into a first display area and a second display area by using a bent part as a boundary. The user may bend the flexible screen to switch the mobile phone from a folded state to an expanded state. In other words, the area-based display instruction in step 902 may be that the foldable mobile phone switches from the folded state to the expanded state. It should be noted that the foldable mobile phone may light up the second display area when detecting that the foldable mobile phone is switched from the folded state to the expanded state. Alternatively, the foldable mobile phone may light up the second display area when an operation on the identifier is detected.

Figure 16B:
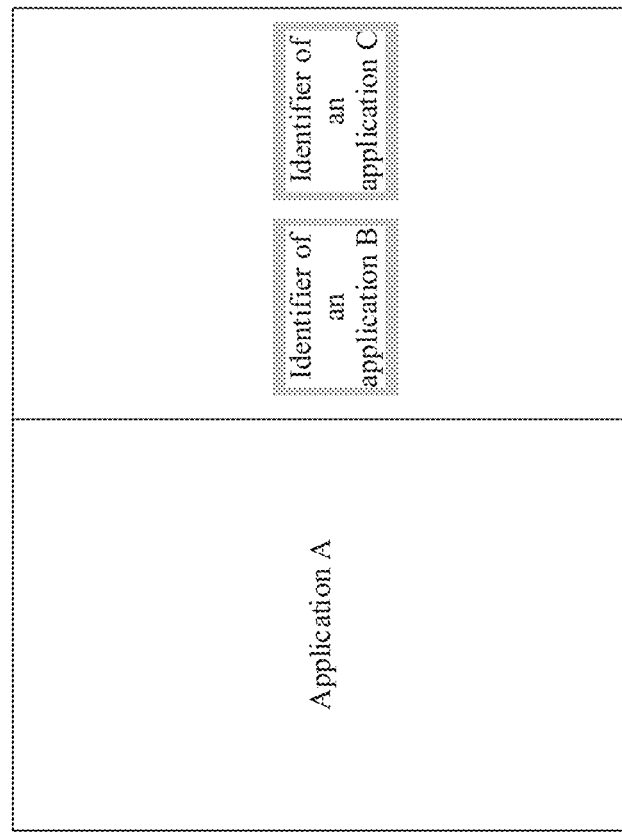
FIG. 16(a) and FIG. 16(b) are a schematic diagram of a scenario of another Embodiment 3 according to an embodiment of this application.
Figure 16A:
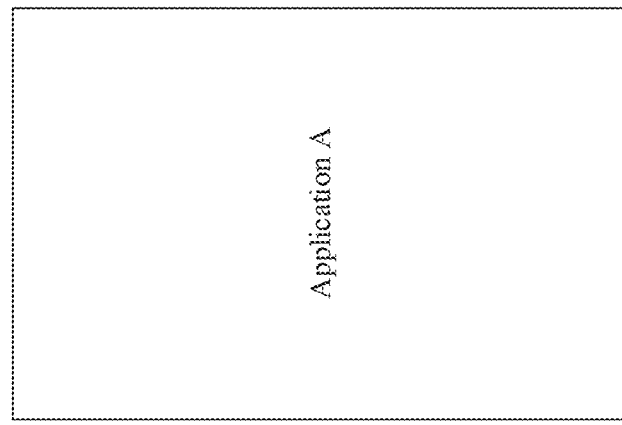

For example, it is assumed that the mobile phone 100 has established an application combination including the application A and the application B, and another application combination of the application A and the application C. As shown in FIG. 16(a), the folding mobile phone is in the folded state, the application window of the application A is displayed in the first display area, and the second display area is in a screen-off state. In this case, if the foldable mobile phone detects that the foldable mobile phone is switched from the folded state to the expanded state, the foldable mobile phone uses any one of the following manners.

Manner 1: As shown in FIG. 16(b), the second display area is automatically lighted up, the application window of the application A is displayed in the first display area, and the identifier of the application B and the identifier of the application C are displayed in the second display area.

Figure 17B:
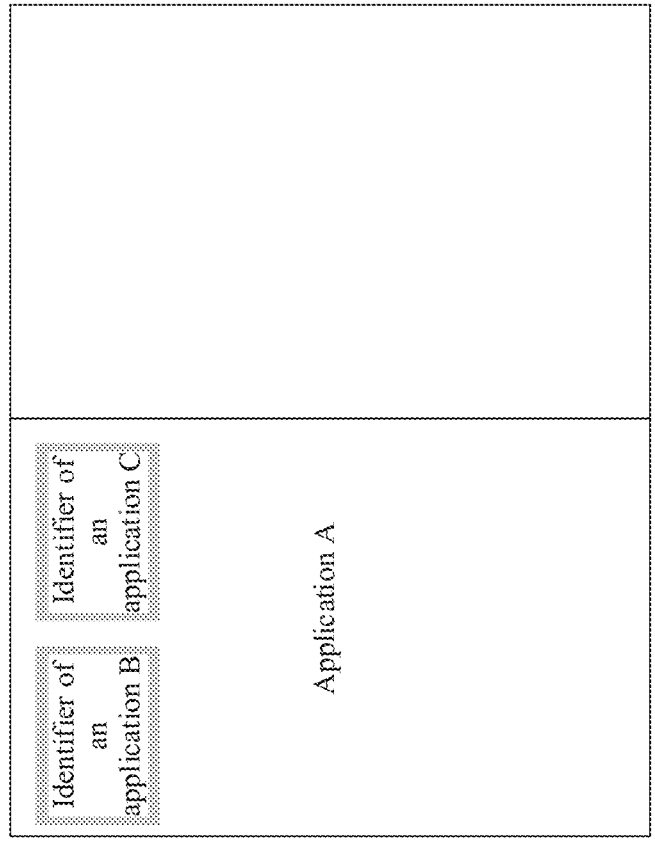
FIG. 17(a) and FIG. 17(b) are a schematic diagram of another scenario of another Embodiment 3 according to an embodiment of this application.
Figure 17A:
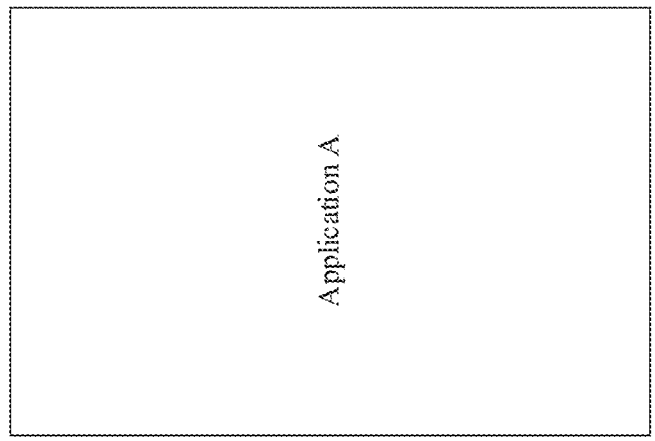

Manner 2: As shown in FIG. 17(b), the identifiers of the application B and the application C are displayed in the first display area, and the second display area is not lighted up. After detecting the operation on the identifier of the application B or the application C, the foldable mobile phone lights up the second display area, and displays the application window of the application B or the application window of the application C in the second display area. FIG. 17(a) is the same as FIG. 16(a). Details are not described herein again.

Figure 18B:
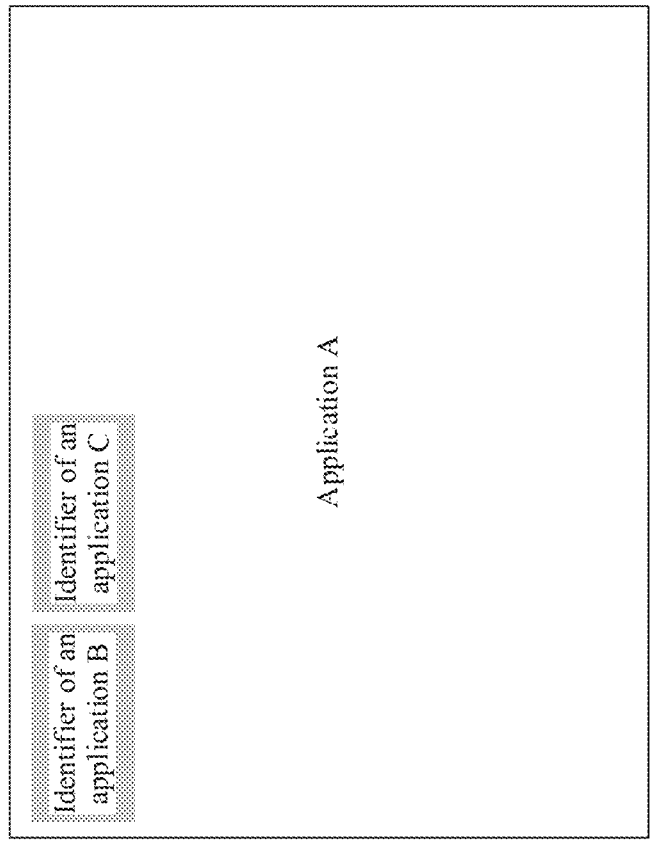
FIG. 18(a) and FIG. 18(b) are a schematic diagram of still another scenario of another Embodiment 3 according to an embodiment of this application.
Figure 18A:
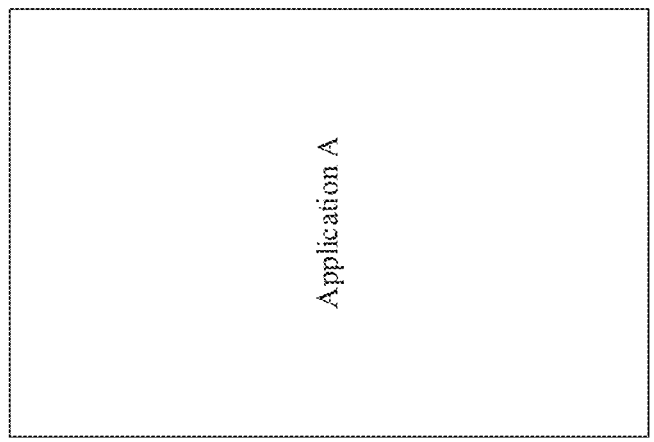

Manner 3: Enter the split-screen mode after the user performs an operation on the identifier of the application. As shown in FIG. 18(a) and FIG. 18(b), the foldable mobile phone displays the application window of the application A in full screen, and displays the identifiers of the application B and the application C overlaid on the application window of the application A Then, after detecting an operation on the identifier of the application B or the application C, the mobile phone enters the split-screen mode, and displays the application window of the application B and the application window of the application A by area, or displays the application window of the application C and the application window of the application A by area. FIG. 18(a) is the same as FIG. 16(a). Details are not described herein again.

Embodiment 4

In the embodiments provided in this application, the method provided in the embodiment of this application is described from a perspective in which the electronic device (the mobile phone 100) is used as an execution body. To implement the functions in the method provided in the embodiments of this application, a terminal device may include a hardware structure and/or a software module, to implement the functions in a form of a hardware structure, a software module, or a hardware structure and a software module. Whether a specific function in the foregoing functions is performed by the hardware structure, the software module, or the combination of the hardware structure and the software module depends on a specific application and a design constraint condition of the technical solutions.

This embodiment discloses an electronic device. The electronic device may include a touchscreen 1901, one or more processors 1902, a memory 1903, and a sensor 1909. The foregoing components may be connected through one or more communications buses 1905. The sensor 1909 may be an acceleration sensor, a gyroscope, or the like.

The memory 1903 may store one or more computer programs, the one or more computer programs are configured to be executed by the one or more processors 1902, and the one or more computer programs include instructions. The foregoing instructions may be used to perform steps in any one of Embodiment 1 to Embodiment 3.

When the electronic device is the mobile phone 100, the processor 1902 may be the processor 110, the sensor 1909 may be the sensor module 180, and the memory 1903 may be the internal memory 121. The touchscreen 1901 may include a touchscreen including a touch sensor 180K and a display 194. When the electronic device is the foregoing foldable mobile phone, the touchscreen 1901 may be a flexible screen. The one or more processors 1902 may determine, based on sensor data detected by the sensor 1909 (for example, the acceleration sensor), whether the foldable mobile phone is in the folded state or the expanded state. For details, refer to the description in FIG. 1. Details are not described herein again.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When the software is used for implementation, all or some of embodiments may be implemented in a form of a computer program product. The computer program product includes one or more computer instructions. When the computer program instructions are loaded and executed on a computer, all or some of the procedures or the functions according to embodiments of this application are generated. The computer may be a general purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are provided with reference to the specific embodiments. However, the foregoing example discussion is not intended to be detailed, and is not intended to limit this application to a disclosed precise form. Based on the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

What is claimed is:

1. A method comprising:
   establishing a virtual combination corresponding to a specified application type comprising a first application type and a second application type;
   automatically determining usage of at least two applications of N applications running on an electronic device at a preset moment and within a preset duration, wherein the preset moment comprises a start point of the preset duration or an end point of the preset duration, wherein N is an integer greater than or equal to 2, and wherein the usage of each of the at least two applications comprises a usage duration or a quantity of switching times;
   automatically establishing, based on the usage and the virtual combination, a first application combination comprising a first application of the first application type and a second application of the second application type in the N applications when the usage duration of both the first application and the second application reaches a threshold within the preset duration or when the quantity of switching times of both the first application and the second application reaches a preset quantity of switching times within the preset duration;
   establishing a second application combination comprising the first application and a third application in the N applications;
   displaying a first application window of the first application;
   receiving an area-based display instruction when displaying the first application window;
   obtaining, in response to the area-based display instruction, the first application combination and the second application combination; and
   performing a first step or second steps,
   wherein the first step comprises simultaneously displaying the first application window, a second application window of the second application, and a third application window of the third application, and
   wherein the second steps comprise:
   displaying a first identifier of the second application and a second identifier of the third application,
   simultaneously displaying the first application window and the second application window when the electronic device receives a first user operation on the first identifier, and
   simultaneously displaying the first application window and the third application window when the electronic device receives a second user operation on the second identifier.

2. The method of claim 1, wherein the N applications comprise X applications that are of the first application type and Y applications that are of the second application type, wherein the X applications comprise the first application, wherein the Y applications comprise the second application, wherein both X and Y are integers greater than or equal to 1, wherein X and Y are equal or unequal, wherein a sum of X and Y is less than or equal to N, and wherein the usage comprises usage of at least one of the X applications and usage of at least one of the Y applications.

3. The method of claim 1, further comprising displaying a virtual combination icon of the virtual combination.

4. The method of claim 3, wherein the virtual combination icon comprises a third identifier of the first application type and a fourth identifier of the second application type.

5. The method of claim 3, wherein determining the usage comprises:
receiving a third user operation on the virtual combination icon; and
determining the usage in response to the third user operation.

6. The method of claim 5, further comprising displaying a first combination icon of the first application combination, wherein the first application combination icon comprises the first identifier and a third identifier of the first application.

7. The method of claim 1, wherein the usage of the at least one application further comprises a usage time.

8. The method of claim 1, further comprising setting a first layout manner of the first application and the second application for the first application combination.

9. The method of claim 8, wherein simultaneously displaying the first application window and the second application window comprises displaying the first application window and the second application window based on the first layout manner, and wherein the method further comprises displaying a first application combination icon based on the first layout manner.

10. The method of claim 8, wherein the first layout manner comprises a display position and/or a display area.

11. The method of claim 10, wherein a first position relationship between a third identifier of the first application and the first identifier comprised in the first application combination icon is the same as a second position relationship between the first application window and the second application window; or wherein a first ratio of a first area of the first identifier to a second area of the second identifier comprised in the first application combination icon is the same as a second ratio of a first display area of the first application window to a second display area of the second application window.

12. The method of claim 1, further comprising:
obtaining, in response to the area-based display instruction, the first application combination related to the first application; and
simultaneously displaying a plurality of application windows comprising the first application window and the second application window.

13. The method of claim 1, wherein the electronic device is a foldable mobile phone, and wherein the area-based display instruction comprises an instruction for changing the electronic device from a folded state to an expanded state.

14. The method of claim 1, wherein the area-based display instruction comprises multi-finger upward sliding.

15. An electronic device comprising:
a touchscreen; and
one or more processors coupled to the touchscreen and configured to:
establish a virtual combination corresponding to a specified application type comprising a first application type and a second application type;
automatically determine usage of at least two applications of N applications running on the electronic device at a preset moment and within in a preset duration, wherein the preset moment comprises a start point of the preset duration or an end point of the preset duration, wherein N is an integer greater than or equal to 2, and wherein the usage of each of the at least two applications comprise a usage duration, a quantity of switching times, and/or simultaneously displaying a plurality of application windows;
automatically establish, based on the usage and the virtual combination, a first application combination comprising a first application of the first application type and a second application of the second application type in the N applications when the usage duration of both the first application and the second application reaches a threshold within the preset duration or when the quantity of switching times of both the first application and the second application reaches a preset quantity of switching times within the preset duration;
establish a second application combination comprising the first application and a third application in the N applications;
display a first application window of the first application;
receive an area-based display instruction when displaying the first application window;
obtain, in response to the area-based display instruction, the first application combination and the second application combination; and
perform a first step or second steps,
wherein the first step comprises simultaneously display the first application window, a second application window of the second application, and a third application window of the third application, and
wherein the second steps comprise:
display a first identifier of the second application and a second identifier of the third application,
simultaneously display the first application window and the second application window when receiving a first user operation on the first identifier, and
simultaneously display the first application window and a third application window when receiving a second user operation on the second identifier.

16. The electronic device of claim 15, wherein the electronic device is a foldable mobile phone, and wherein the area-based display instruction comprises an instruction for changing the electronic device from a folded state to an expanded state.

17. The electronic device of claim 15, wherein the area-based display instruction comprises multi-finger upward sliding.

18. A computer program product comprising computer-executable instructions stored on a non-transitory computer readable storage medium that, when executed by a processor, cause an electronic device to:
establish a virtual combination corresponding to a specified application type comprising a first application type and a second application type;
automatically determine usage of at least two applications of N applications running on the electronic device at a preset moment and within a preset duration, wherein the preset moment comprises a start point of the preset duration or an end point of the preset duration, wherein N is an integer greater than or equal to 2, and wherein the usage of each of the at least two applications comprise a usage duration, a quantity of switching times, and/or simultaneously displaying a plurality of application windows;

automatically establish, based on the usage and the virtual combination, a first application combination comprising a first application of the first application type and a second application of the second application type in the N applications when the usage duration of both the first application and the second application reaches a threshold within the preset duration or when the quantity of switching times of both the first application and the second application reaches a preset quantity of switching times within the preset duration;

establish a second application combination comprising the first application and a third application in the N applications;

display a first application window of the first application;

receive an area-based display instruction when displaying the first application window;

obtain, in response to the area-based display instruction, the first application combination and the second application combination; and perform a first step or second steps, wherein the first step comprises simultaneously display the first application window, a second application window of the second application, and a third application window of the third application, and wherein the second steps comprise:

display a first identifier of the second application and a second identifier of the third application, simultaneously display the first application window and the second application window when the electronic device receives a first user operation on the first identifier, and simultaneously display the first application window and the third application window when the electronic device receives a second user operation on the second identifier.

19. The computer program product of claim 18, wherein the computer-executable instructions that, when executed by the processor, further cause the electronic device to display a virtual combination icon of the virtual combination.

20. The computer program product of claim 18, wherein the computer-executable instructions that, when executed by the processor, further cause the electronic device to set a first layout manner of the first application and the second application for the first application combination.

* * * * *